(12) United States Patent
Cravalho et al.

(10) Patent No.: US 12,486,156 B2
(45) Date of Patent: Dec. 2, 2025

(54) ALKALINE WATER DISPENSING APPARATUS WITH WATER CONSUMPTION TRACKING FUNCTIONALITY

(71) Applicant: Generosity Water, Inc., Montebello, CA (US)

(72) Inventors: Micah Cravalho, La Quinta, CA (US); Jasmine Davenport, Los Angeles, CA (US); Lamont Wright, Blue Jay, CA (US)

(73) Assignee: Generosity Water, Inc., Montebello, CA (US)

( * ) Notice: Subject to any disclaimer, the term of this patent is extended or adjusted under 35 U.S.C. 154(b) by 315 days.

(21) Appl. No.: 18/234,030

(22) Filed: Aug. 15, 2023

(65) Prior Publication Data

US 2024/0059542 A1    Feb. 22, 2024

Related U.S. Application Data

(60) Provisional application No. 63/398,399, filed on Aug. 16, 2022.

(51) Int. Cl.
*B67D 1/00* (2006.01)
*B67D 1/08* (2006.01)
*B67D 1/12* (2006.01)

(52) U.S. Cl.
CPC ......... *B67D 1/0014* (2013.01); *B67D 1/0884* (2013.01); *B67D 1/1243* (2013.01);
(Continued)

(58) Field of Classification Search
CPC .. B67D 1/0014; B67D 1/0884; B67D 1/0888; B67D 1/1243; B67D 1/1231; B67D 1/1211; B67D 1/12; B67D 2210/0001; B67D 2210/00018; B67D 2210/00118; B01D 29/60; B01D 61/04; B01D 61/12; B01D 2311/04; B01D 2311/06; B01D 2311/18; B01D 2311/251; B01D 2311/2512; B01D 2311/2649; C02F 1/008; C02F 1/441; C02F 1/66; C02F 2209/02;
(Continued)

(56) References Cited

U.S. PATENT DOCUMENTS 5,853,579 A    12/1998  Rummler et al.
6,193,886 B1    2/2001  Nohren, Jr.
(Continued)

FOREIGN PATENT DOCUMENTS

WO    2014093049 A1    6/2014
WO    2021234709 A1    11/2021

OTHER PUBLICATIONS

Non-patent literature to Wikipedia page, "Magnesium Sulfate" (Year: 2023).*

*Primary Examiner* — Sang Y Paik
*Assistant Examiner* — Bonita Khlok
(74) *Attorney, Agent, or Firm* — NEO IP

(57) ABSTRACT

The present invention includes a station for dispensing water, specifically alkaline water having a stable pH of between about 8 and about 10. Additionally, the station includes at least one radiofrequency identification (RFID) chip sensor, configured to detect a unique RFID chip in, for example, a bottle of water and automatically update a user profile associated with the unique RFID chip to indicate an amount of water consumed.

12 Claims, 15 Drawing Sheets

(52) U.S. Cl.
CPC ............... *B67D 2210/0001* (2013.01); *B67D 2210/00018* (2013.01); *B67D 2210/00118* (2013.01)

(58) Field of Classification Search
CPC ............. C02F 2209/05; C02F 2209/06; C02F 2209/10
USPC ............. 99/275, 279–280, 285, 289 R, 294, 99/298–300, 308
See application file for complete search history.

(56) References Cited

U.S. PATENT DOCUMENTS

| | | | |
|---|---|---|---|
| 6,245,701 | B1 | 6/2001 | Sato |
| 6,294,073 | B1 | 9/2001 | Shirota et al. |
| 6,464,845 | B2 | 10/2002 | Shirota et al. |
| 6,572,902 | B2 | 6/2003 | Abramowitz et al. |
| 6,928,954 | B2 | 8/2005 | Krishnamurthy |
| 7,712,613 | B2 | 5/2010 | Bahm et al. |
| 7,931,683 | B2 | 4/2011 | Weber et al. |
| 8,318,191 | B2 | 11/2012 | Yun et al. |
| 8,454,837 | B2 | 6/2013 | Bauer |
| 8,550,257 | B2 | 10/2013 | Harvey |
| 8,784,662 | B2 | 7/2014 | Becker et al. |
| 9,067,807 | B2 | 6/2015 | Soane et al. |
| 9,212,067 | B2 | 12/2015 | Gellibolian et al. |
| 9,704,329 | B2 | 7/2017 | Locke et al. |
| 10,294,128 | B2 | 5/2019 | Xiao |
| 10,433,666 | B1 * | 10/2019 | Jovanov .............. B65D 43/0202 |
| 10,532,303 | B2 | 1/2020 | Gibson et al. |
| 11,479,455 | B2 | 10/2022 | Fantappie et al. |
| 2003/0164333 | A1 | 9/2003 | Nohren et al. |
| 2008/0035552 | A1 | 2/2008 | Lee |
| 2009/0084726 | A1 | 4/2009 | Lee |
| 2010/0163472 | A1 | 7/2010 | Thiers et al. |
| 2011/0198271 | A1 | 8/2011 | Lee et al. |
| 2012/0103926 | A1 | 5/2012 | Ibsies |
| 2013/0122150 | A1 | 5/2013 | Kim |
| 2015/0315008 | A1 * | 11/2015 | Locke .................. B67D 1/0888 222/52 |
| 2016/0299096 | A1 * | 10/2016 | Greenwood .............. C02F 1/66 |
| 2017/0203986 | A1 | 7/2017 | Ervin |
| 2018/0022620 | A1 | 1/2018 | Garg |
| 2018/0134586 | A1 | 5/2018 | Weston et al. |
| 2019/0118124 | A1 | 4/2019 | Jhee |
| 2020/0247700 | A1 | 8/2020 | Genin et al. |
| 2021/0002149 | A1 | 1/2021 | Adams |
| 2021/0002160 | A1 | 1/2021 | Van Gils et al. |
| 2021/0069615 | A1 * | 3/2021 | Nap .................... B01D 35/303 |
| 2021/0321653 | A1 | 10/2021 | Kubota |
| 2022/0073397 | A1 | 3/2022 | Dus et al. |
| 2022/0098057 | A1 * | 3/2022 | Bolton .................... C02F 1/008 |
| 2022/0127172 | A1 * | 4/2022 | Friesen .................... C02F 1/32 |
| 2022/0153613 | A1 | 5/2022 | Katragadda |
| 2022/0335771 | A1 * | 10/2022 | Mullenaux ........... B67D 1/0888 |
| 2023/0113840 | A1 * | 4/2023 | Friesen .................... C02F 1/66 210/760 |

* cited by examiner

ALKALINE WATER DISPENSING APPARATUS WITH WATER CONSUMPTION TRACKING FUNCTIONALITY

CROSS-REFERENCE TO RELATED APPLICATIONS

This application is related to and claims priority from the following US patents and patent applications: this application claims priority from U.S. Provisional Patent Application No. 63/398,399, filed Aug. 16, 2022, which is incorporated herein reference in its entirety.

BACKGROUND OF THE INVENTION

1. Field of the Invention

The present invention relates to devices for dispensing alkaline water, and more specifically to devices including functionality for tracking water consumption.

2. Description of the Prior Art

It is generally known to provide water treatment or water purification.

Prior art patent documents include the following:

U.S. Pat. No. 11,479,455 for Water dispensing station by inventors Fantappie et al., filed May 15, 2020 and issued Oct. 25, 2022, discloses a drink station with an alkaline filter cartridge in fluid communication with an ambient temperature water line provide alkaline water, and with a chilled water mixed with the alkaline water at a spigot to provide chilled alkaline water. A hot water heating element is located below the spigot so hot water flows upward for dispensing from the spigot, with a vent line between the heating element and spigot helping hot water to flow from the spigot to the heating element. A refrigeration system and a carbonation system is also provided. The refrigeration system uses the ice-bank technology. A submersible agitator pump improves heat exchanged between ice-bank and water by forced convection. The agitator pump operating based on the temperature of the drinking water. A figure eight evaporator coil can provide two cylindrical ice banks and two chilled water coils to increase the chilled water capacity.

U.S. Pat. No. 9,704,329 for System and method for dispensing consumable liquids by inventors Locke et al., filed May 1, 2015 and issued Jul. 11, 2017, discloses a networked system for providing and maintaining a set of liquid dispenser stations. The fluid dispensers communicate with a managing/supervisory cloud server via an interposed base station. The fluid dispensers communicate locally with the base station via wireless communication network links. The base station operates as an accumulator of status/usage information provided by the dispenser stations and bridge for passing information and control commands between the cloud server and the individual dispenser stations. The dispenser stations are configured with control processors (controllers) to facilitate performing a variety of local control operations associated with dispensing liquids that have been cooled (or heated) prior to dispensing by the dispenser stations. Additionally, the dispenser stations cooperatively operate with the cloud server (via the base station) to support a variety of real time control and maintenance operations relating to the dispenser stations operating at potentially thousands of distinct geographic locations.

U.S. Patent Publication No. 2012/0103926 for Sports Bottle and Fluid Dispensing system, device, and method by inventor Ibsies, filed Nov. 2, 2010 and published May 3, 2012, discloses a sports bottle having a conventional open top with fitting lid, generally vertical sidewalls forming a cylinder with a bottom includes a valve mechanism for filling the bottle from a position other than the open top. The bottle further includes means for identifying the bottle to a dispensing machine. The dispensing machine interfaces with the valve mechanism to enable fluid to flow into the bottle to a pre-determined level. The valve mechanism further includes means for enabling the escapement of air or other gases during the fluid filling operation. The dispensing machine begins a pressurized flow of filtered water or other desired fluid when the bottle is positioned on the machine.

US Patent Publication No. 2022/0153613 for Ultra-High Alkaline Electrolyzed Water Generation System by inventor Katragadda, filed Nov. 20, 2020 and published May 19, 2022, discloses an ultra-high alkaline electrolyzed water generation system with a pH 12.5-13.5 pH. The ultra-high alkaline electrolyzed water generation system includes an electrolytic cell, a first tank, a second tank, a water tank, and a plurality of flowlines. The ultra-high alkaline electrolyzed water generation system is cost-effective. The ultra-high alkaline electrolyzed water generation system enables production of ultra-high alkaline electrolyzed water at faster rate for commercial and industrial applications with a large shelf life and can be stored in containers for later use. The invention also provides an electrolytic cell. The electrolytic cell includes a cathode chamber, an anode chamber, and a cation permselective membrane. The electrolytic cell enables production of the ultra-high alkaline electrolyzed water. The ultra-high alkaline electrolyzed water with a configurable pH range has the ability to sterilize, clean and disinfect without the use of harsh chemicals.

U.S. Pat. No. 6,245,701 for Porous ceramic for producing alkali ion water, method for producing the porous ceramic and device for producing the alkali ion water by inventor Sato, filed Jan. 28, 1999 and issued Jun. 12, 2001, discloses a porous ceramic used for producing alkali ion water. The ceramic of the invention includes finely particulate zeolite having an average particle size of 0.1 to 40 µm and an alkali ion producing material as components. Besides the above components, the invention preferably comprises a fibrous mineral and/or a clay mineral. To produce the ceramic of the invention, a slurry obtained by grinding zeolite by a wet process, a slurry obtained by grinding the alkali ion producing material and the clay mineral by a wet process and a slurry obtained by grinding the fibrous mineral are first mixed and stirred to prepare a mixed slurry. This mixed slurry is then dried and fired to obtain a sintered body.

US Patent Publication No. 2018/0134586 for Process of making alkaline and acidic water by inventors Weston et al., filed May 5, 2016 and published May 17, 2018, discloses a process of making an alkaline water and acidic water wherein the step of dissolving the alkaline salt in the initial stream is further defined as adding the alkaline salt of a lower alkyl carboxylic acid of sodium propionate to the initial stream. The step of electrolyzing the feed stream further includes a step of applying an electric potential between the cathode and the anode. The step of applying the electrical potential is further defined as applying the electrical potential of between 0.5V and 50 V between the cathode and the anode. The alkaline water composition produced by the process includes zero hydroxide ions and defines a total alkalinity between 40 ppm and 510 ppm. The alkaline water also has a TDS between 58 ppm and 1000 ppm, a pH between 10.0 and 12.0, a hardness rating between 3.5 and 10, and a Langelier Index between 0.37 and 2.20.

US Patent Publication No. 2021/0002149 for Production of Highly Ionized Alkaline Water Using a Combination of Reducing Metals and Reductive Minerals by inventor Adams, filed Sep. 21, 2020 and published Jan. 7, 2021, discloses methods and systems are provided for producing ionized alkaline solutions (e.g. ionized alkaline water) that exhibit long-term stability when stored at room temperature.

U.S. Pat. No. 6,572,902 for Process for producing improved alkaline drinking water and the product produced thereby by inventors Abramowitz et al., filed Apr. 25, 2001 and issued Jun. 3, 2003, discloses a process for producing improved alkaline water including filtering potable source water to remove selected particles and then purifying the filtered water. Selected alkaline minerals are added to the purified water, with the resulting mineralized water being then electrolyzed to produce streams of acidic water and alkaline water, the alkaline water having a pH within the range of 9-10, a TDS range of 22-240 ppm (parts per million) and alkalinity in the range of 12-216 ppm.

U.S. Pat. No. 6,464,845 for Manufacturing method and apparatus for making alkaline ionized water and acidic water by inventors Shirota et al., filed May 9, 2001 and issued Oct. 15, 2002, discloses a manufacturing apparatus for producing alkaline ionized water and acidic water by electrolysis of water having an electrolytic bath including a cathode cell, an intermediate cell, and an anode cell, separated by diaphragms; an electrolysis solution bath connected to the intermediate cell via an electrolysis solution circulating line and an electrolysis solution circulating pump; a circulation container bath for alkaline ionized water connected to the cathode cell via an alkaline ionized water circulating line and an alkaline ionized water circulating pump; a supplying line for raw material water for producing acidic water connected to an inlet of the anode cell; a withdrawing line for acidic water connected to an outlet of the anode cell; a supplying system for raw material water for making the alkaline ionized water connected to the circulation container bath and a withdrawing line with a water collecting device for withdrawing alkaline ionized water.

U.S. Pat. No. 6,294,073 for Manufacturing method and apparatus of alkaline ionized water by inventors Shirota et al., filed Oct. 20, 1998 and issued Sep. 25, 2001, discloses a manufacturing method and apparatus of strongly alkaline ionized water exceeding pH 12.0 by electrolysis of water. As an electrolysis solution supplied to a cathode cell of an electrolytic bath, alkaline ionized water produced in the cathode cell is used, and an operation, in which the alkaline ionized water produced in the cathode cell is circulated and supplied to the cathode cell and is subjected to application of electrolytic voltage, is repeated, so that a cation is accumulated to increase the pH value. As a method for circulating and supplying the alkaline ionized water produced in the cathode cell to the cathode cell, a circulation container bath is used, and the circulation container bath and the cathode cell of the electrolytic bath are connected via a circulating line containing a circulating pump. The circulation container bath has a withdrawing system containing a water collecting device for withdrawing alkaline ionized water having a desired pH value to the outside.

US Patent Publication No. 2017/0203986 for Water purification system by inventor Ervin, filed Jan. 13, 2017 and published Jul. 20, 2017, discloses systems for water treatment include a preprocessing stage, an ultraviolet treatment stage, and a filtering stage. The preprocessing stage includes first and second chambers including first and second filter media. The first and second chambers include perforated plates. The first chamber and second chamber are vertically arranged in a filter tower. The ultraviolet treatment stage receives water in a plurality of reactor tanks. Each reactor tank of the plurality includes an inlet, an outlet, crystal sleeve disposed centrally to the interior of the reactor tank, and a UVC light source contained within the crystal sleeve. A controller operates the ultraviolet treatment stage to sequentially fill each reactor tank and sequentially drain each reactor tank and operates a respective UVC light source to emit UVC wavelength radiation within a respective reactor tank while water is in the respective reactor tank.

US Patent Publication No. 2022/0073397 for Combined water filtration system for enhancing drinking water properties for human health by inventors Dus et al., filed Jan. 9, 2020 and published Mar. 10, 2022, discloses a water filtration system for producing filtrated drinking water having increased persistence of free hydrogen, pH and ORP level, includes a pre-filtration device having an inlet terminal configured for being connected with a water source and an outlet terminal; the water filtration system being characterized in further comprising a far-Infrared, fIR, filtration device having an inlet terminal in connection with the outlet terminal of the pre-filtration device and an outlet terminal; and an elemental hydrogen releasing device having an inlet terminal in connection with the outlet terminal of the fIR filtration device and an outlet terminal, the elemental hydrogen releasing device configured for utilizing a reaction between elemental magnesium, Mg, or a magnesium mineral and water flowing there through and configured for releasing free hydrogen and Mg2+ ions to water flowing there through with a Mg2+ release rate in the range from 20 to 40 mg/l of Mg2+ ions.

US Patent Publication No. 2019/0118124 for Hydrogen water and magnetic water generating water bottle by inventor Jhee, filed Feb. 23, 2017 and published Apr. 25, 2019, discloses a hydrogen water and magnetic water generating water bottle simultaneously turning water filled into the water bottle into magnetic water and hydrogen water, enabling both the top and bottom of the water bottle to be opened using top and bottom caps, enabling the internal cleaning of the water bottle to be cleanly carried out, and enabling the easy exchange of a magnetic water generating means and a hydrogen water generating means. The water bottle includes top and bottom opening parts. Magnetic water generating means is detachably provided to penetrate the top opening part, is disposed in the top of an inner part of the water bottle, and discharges upwardly the water filled into the water bottle. Hydrogen water generating means is detachably provided to penetrate the bottom opening part and is disposed in the bottom of the inner part.

U.S. Pat. No. 9,212,067 for Water bottle with flow meter by inventors Gellibolian et al., filed May 30, 2013 and issued Dec. 15, 2015, discloses a fluid and/or aqueous additive delivery system. A modular fluid container is for consumption of liquids. Fluid containers include any combination of four distinct modular components; (1) an end-point filter purification module for removal of impurities from water, (2) a UV purification module for emitting ultraviolet (UV) light in a germicidal spectrum for disinfection, (3) a tablet storage and dispensing module to emit ultraviolet (UV) light in a germicidal spectrum for disinfection of a volume of drink liquid held in the container, (4) a flow meter module for quantitatively monitoring hydration in real time. The user can personalize the bottle with any or all modules that are required.

U.S. Pat. No. 6,193,886 for Sub-micron sport bottle with ceramic filtering element by inventor Nohren, filed Aug. 11, 1998 and issued Feb. 27, 2001, discloses a ceramic filter assembly for use in a bottle for filtering water exiting the bottle so as to remove substantially all protozoa and bacteria from the water. The assembly includes a self-supporting ceramic filtering material element having a pore size of about 0.55 microns or less (e.g. about 0.45 microns) yet having a large open volume (e.g. between 40-85%, preferably between 51-80%), so that water may pass through it at a rate of 2 milliliters per second or more (e.g. 3-6 milliliters per second) with an initial head pressure of no more than 24 inches of water, so that the water may readily be passed through the filter by inverting and/or squeezing the plastic bottle containing the filter. A second, non-ceramic, filter element (such as a carbon block filter for reducing chlorine) may be mounted within the ceramic filter element, and a positively charged coating may be provided on the external surface of the ceramic filter element capable of attracting and holding negatively charged viruses. Water can be removed from the bottle by attaching the filter assembly to a straw, or the filter assembly may be mounted to a cap having a manual valve.

US Patent Publication No. 2009/0084726 for Multi-functional dual filtering kettle by inventor Lee, filed Sep. 28, 2007 and published Apr. 2, 2009, discloses a multi-functional dual filtering kettle comprising a kettle body; a filter received in the kettle body; a cover covering upon an upper opening of the kettle body; an inner side of the filter having a ceramic filter unit and a compound filter unit being installed below the filter. The ceramic filter unit has the function of emitting far field infrared rays; and the compound filter unit filter has the function of removing the impurities, microorganisms, odor, and organic compounds in water. The ceramic filter unit has a plurality of biochemical ceramic balls which has the function of emitting far field infrared rays. A hollow space of the compound filter unit is filled with a filter layer, an active carbon layer, and a ceramic layer.

U.S. Pat. No. 6,928,954 for Automatic pet waterer by inventor Krishnamurthy, filed Oct. 23, 2003 and issued Aug. 16, 2005, discloses a pet watering system which includes a refillable reservoir for holding water. A base is provided that holds the reservoir and receives water therefrom. Secured to the front of the base is a bowl which receives water from the base. A pump circulates water between the base and the bowl. A well is associated with the base, into which water is received from the base before being circulated into the bowl.

US Patent Publication No. 2020/0247700 for Multistage shower water filter and water filtering method by inventors Genin et al., filed Feb. 1, 2019 and published Aug. 6, 2020, discloses a multistage shower filter assembly for water filtering having an in-line reversible filter, changeable by unscrewing two portions of the housing. The housing exterior includes a plurality of gripping means to allow easy opening and closing of the housing and to prevent slippage of the hands of a user gripping the two portions, even when wet. The multistage shower filter assembly includes a separate internal multistage filter element that may be easily inserted into or removed from the multistage shower filter assembly to allow the internal filter element to be easily reversed for longer use.

US Patent Publication No. 2003/0164333 for In-line hydration pack biological filter by inventors Nohren et al., filed Feb. 12, 2003 and published Sep. 4, 2003, discloses a portable filtration assembly including a housing containing a water inlet port and a water outlet port and a sub-micron filter disposed in the housing having hydrophilic sub-micron rated membrane filter elements. The sub-micron filter is configured to effect a six log reduction of bacteria (99.9999%) and a four log reduction of protozoa (99.99%) at a flow rate between 10-30 mL/sec requiring a pressure of 1.5-10 psi. The assembly also includes structure for venting air through the hydrophilic sub-micron rated membrane filter elements. The assembly may additionally include a monolithic radial flow carbon composite filter also disposed in the housing. The monolithic radial flow carbon composite filter is configured for removing at least 80% of chlorine and at least 90% of lead over a minimum of forty gallons at a flow rate of 10 mL/sec at a pressure drop of 10 psi or less.

US Patent Publication No. 2011/0198271 for Water purifier for outdoor by inventors Lee et al., filed Mar. 27, 2008 and published Aug. 18, 2011, discloses an outdoor water purifier using a ceramic filter. The outdoor water purifier is installed in home water pipes or water supply pipes for various industrial purposes to sterilize water and improve water purity. The outdoor water purifier includes a water gauge that measures the flow of tap water to calculate the water use rate, a filter connected to the water gauge for filtering tap water, a filter alarm that measures the state of the filter, and an RF transmitter connected to the filter for wirelessly transmitting data of tap water use rate according to the amount of tap water used. The filter is installed to a water supply pipe and configured in such a way that a carbon layer, a ceramic layer, an antibacterial layer, and a fine ceramic layer, stacking from the top thereof, in order to improve taste and to remove odor and bacteria contained in raw water.

US Patent Publication No. 2008/0035552 for Multi-function and multi-layer filtration device by inventor Lee, filed May 18, 2006 and published Feb. 14, 2008, discloses a filtration device mainly containing a hollow body member having a water inlet and a water outlet at two ends; a number of open-top container members vertically stacked and reliably positioned, inside the body member; and a number of agent members placed inside the container members respectively. Each of the container members has a number of through holes arranged spirally at the bottom so that the water is forced into a swirl as it flows through the container members to make full utilization of the agent members. The body member is sealed by a cover that can be easily twisted close or open. As such, the standardized container members can be easily accessed and the agent members can be easily replaced.

U.S. Pat. No. 9,067,807 for Treatment of wastewater by inventors Soane et al., filed Oct. 20, 2010 and issued Jun. 30, 2015, discloses systems, methods and devices for removing contaminants from an aqueous stream. In embodiments, these systems and methods may be applied to particular applications, for example removal of contaminants in aqueous streams associated with the petroleum industry.

US Patent Publication No. 2010/0163472 for Water purification system by inventors Thiers et al., filed Mar. 21, 2008 and published Jul. 1, 2010, discloses systems and methods for water purification. The system can include devices and methods for reducing scale accumulation in a water distillation system.

US Patent Publication No. 2021/0002160 for Membrane filtration apparatus and process for reuse of industrial wastewater by inventors Van Gils et al., filed Sep. 20, 2020 and published Jan. 7, 2021, discloses laundry, industrial or food processing wastewater being purified to the degree that it can be reused. Water quality is ensured through the final process of reverse osmosis ("RO") which removes dissolved contaminants such as mineral hardness, soils and residual detergents. The process combines a ceramic tubular cross-flow membrane filter to remove the suspended solids, oils and greases ahead of the RO. The RO process employs high temperature, low fouling membranes. This enables the RO process to operate sustainably, i.e. without fouling, plugging or membrane degradation.

U.S. Pat. No. 8,550,257 for Ceramic water purification device by inventor Harvey, filed Jun. 2, 2010 and issued Oct. 8, 2013, discloses a ceramic water purifying device. The device includes a silver treated packed particle bed in one embodiment. The device may also include feldspar or bottled glass.

U.S. Pat. No. 10,532,303 for Ceramic filters by inventors Gibson et al., filed Mar. 11, 2014 and issued Jan. 14, 2020, discloses additively manufactured ceramic filters. A plurality of pores, each having a uniform geometry, are arranged between an inlet surface and an outlet surface of a single unit of ceramic such that the plurality of pores change in size uniformly from the inlet surface to the outlet surface. The pores are respectively interconnected, and the size, shape, orientation, and/or interconnection of the pores are chosen to provide hydrodynamic features that provide effective filtration for a given liquid and contamination. The pores are additively manufactured with optimized precision.

U.S. Pat. No. 8,318,191 for Porous material having hierarchical porous structure and preparation method thereof by inventors Yun et al., filed Oct. 16, 2008 and issued Nov. 27, 2012, discloses porous ceramic balls with a hierarchical porous structure ranging in size from nanometers to micrometers, and preparation methods thereof. Self-assembly polymers and sol-gel reactions are used to prepare porous ceramic balls in which pores ranging in size from ones of nanometers to tens of micrometers are hierarchically interconnected to one another. This hierarchical porous structure ensures high specific surface areas and porosities for the porous ceramic balls. Further, the size and distribution of the pores can be simply controlled with hydrophobic solvent and reaction time. The pore formation through polymer self-assembly and sol-gel reactions can be applied to ceramic and transition metals. Porous structures based on bioceramic materials, such as bioactive glass, allow the formation of apatite therein and thus can be used as biomaterials of bioengineering, including bone fillers, bone reconstruction materials, bone scaffolds, etc.

U.S. Pat. No. 7,712,613 for Water filter materials and water filters containing a mixture of microporous and mesoporous carbon particles by inventors Bahm et al., filed Sep. 16, 2008 and issued May 11, 2010, discloses a filter and filter material for providing or treating potable water. The filter includes a housing having an inlet and an outlet, a filter material disposed within the housing, the filter material formed at least in part from a mixture of a plurality of mesoporous and microporous activated carbon particles. Preferably, at least some of the mesoporous activated carbon filter particles are coated with a cationic polymer, and even more preferably, at least some of the particles are coated with a cationic polymer and silver or a silver containing material. Kits comprising filters and information relating to the reduction, killing or removal of bacteria, viruses, microbials, and TTHM are also provided.

U.S. Pat. No. 7,931,683 for Articles having ceramic coated surfaces by inventors Weber et al., filed Jul. 27, 2007 and issued Apr. 26, 2011, discloses articles which comprise a substrate and a ceramic coating which covers at least a portion of the substrate surface. The ceramic coating includes raised ceramic shells connected by a ceramic layer that is conformal with the substrate. According to another aspect of the present invention, carbon nanotubes are provided, which comprise a ceramic coating covering at least a portion of the carbon nanotubes.

US Patent Publication No. 2018/0022620 for Walter Filtration Device by inventor Garg, filed Jul. 24, 2016 and published Jan. 25, 2018, discloses a portable, single-chambered, hand-pressurized water filtration device employing a two-part filtration unit consisting of a ceramic filter and an activated charcoal filter through which pressurized water is forced, filtered and removed via a spigot in fluid communication with the filtration unit.

U.S. Pat. No. 8,784,662 for Filtration with internal fouling control by inventors Becker et al., filed Sep. 12, 2008 and issued Jul. 22, 2014, discloses filtration processes and systems for the separation of a filterable fluid stream by a filtration membrane module with uniform transmembrane pressure and flux along the membrane and internal control of membrane fouling via intermittent periodic reduction of the pressure differential between the permeate and retentate sides of the membrane and/or backwashing cycles during separation, recovery, and/or purification of proteins, peptides, nucleic acids, biologically produced polymers and other compounds or materials from aqueous fluids.

U.S. Pat. No. 8,454,837 for Systems and methods for generation of low zeta potential mineral crystals to enhance quality of liquid solutions by inventor Bauer, filed May 3, 2010 and issued Jun. 4, 2013, discloses methods and systems for enhancing of quality of liquid by treating a source liquid to enhance the concentration of low zeta potential crystals and produce a treated liquid having a higher concentration of low zeta potential crystals than that of the source liquid. The inventive system comprises an aqueous liquid source having a threshold concentration of selected minerals and a low zeta potential crystal generator for treating the aqueous source liquid to produce treated liquid having an enhanced concentration of low zeta potential crystals.

U.S. Pat. No. 5,853,579 for Treatment system by inventors Rummler et al., filed Nov. 26, 1996 and issued Dec. 29, 1998, discloses a treatment system which can treat solid materials and/or liquid materials. Preferably, a separator initially separates liquid and solid materials, and the solid materials are deposited upon a substrate within a microwave cavity. Liquids remaining with the solid materials drain through the substrate, and the solid materials are subjected to microwaves. The liquids exiting the separator are preferably also passed through a filter assembly which retains any suspended particles remaining in the liquid, and subjects the particles to microwaves. Exhaust filters can also be provided for the microwave cavities, and the exhaust filters can also be subject to microwaves to incinerate any particles remaining in the exhaust gas. Fire tube arrangements for incinerating solid materials retained or extracted by substrates or filters are also provided.

U.S. Pat. No. 10,294,128 for Device for preparing drinking water by electrolysis by inventor Xiao, filed Apr. 10, 2015 and issued May 21, 2019, discloses a device preparing drinking water by electrolysis, belonging to the technical field of equipment for electrolysis of water. The device includes a water container, at least one pair of a cathode and an anode arranged within the water container, and an electrolysis power source used for supplying electricity to the cathode and the anode; a water-permeable membrane is arranged between the coupled cathode and anode, and the water-permeable membrane covers the anode, the range of the distance 6 between the water-permeable membrane and the cathode being 0<6<10 mm. The device, when electrolyzing water, can prepare water which has a low oxidation reduction potential, is rich in hydrogen and has a certain sterilization capability and is suitable for drinking.

US Patent Publication No. 2013/0122150 for Alkaline Antioxidant Mineral Water by inventor Kim, filed Nov. 16, 2011 and published May 16, 2013, discloses an alkaline antioxidant mineral water comprising tripotassium phosphate and multiple healthful minerals in water, which is free of chlorine, fluoride, and heavy metals. The alkaline mineral water further includes organic potassium, calcium, zinc, magnesium, selenium and 79 trace minerals from ancient sea salt. The trace minerals are taken from the low-sodium technically-processed magnesium chloride marine deposits and chelated with amino acids. The amino acids are obtained from a non-animal source which is suitable for vegetarian and persons who are allergic to animal proteins. The alkaline antioxidant mineral water neutralizes and eliminates the excess acids in human body, thus improving blood circulation. In addition, it provides electrolytes and minerals, which are beneficial to human body.

US Patent Publication No. 2021/0321653 for Functional Water by inventor Kubota, filed Jan. 20, 2020 and published Oct. 21, 2021, discloses a functional water containing a polyfunctional amine and/or a salt thereof as a functional component, wherein the total content of water, the polyfunctional amine, and the salt of the polyfunctional amine is 95% by weight or more. The polyfunctional amine is at least a specific polyamine, a polymer having a structural unit derived from a specific cyclic amine, or a polymer having a structural unit derived from a specific unsaturated amine. The total content of the polyfunctional amine and/or salt thereof is preferably 0.0001 to 10000 ppm by weight. The functional water has functions including freshness-keeping for foods, aging of foods, antisepsis, deodorization, adjustment of plant growth, life extension for cut flowers, flowering control for cut flowers, pest control, pest repellence, improvement of bowel movement, reduction of fecal odor, reduction of blood pressure, increase of body temperature, improvement of the intraoral environment, prevention of halitosis, and prevention of body odor.

SUMMARY OF THE INVENTION

The present invention relates to devices for dispensing alkaline water, and more specifically to devices including functionality for tracking water consumption.

It is an object of this invention to provide a station for tracking water intake and dispensing stable pH alkaline water.

In one embodiment, the present invention is directed to an apparatus for dispensing water and tracking water consumption, including a water inlet and/or storage tank, a mineral infuser system connected to the water inlet and/or storage tank, wherein the mineral infuser system includes at least one bioceramic material, at least one total dissolved solids (TDS) sensor and/or at least one pH sensor configured to determine TDS and/or pH of water exiting the mineral infuser system, at least one valve configured to recirculate water exiting the mineral infuser system back into the mineral infuser system if the TDS and/or the pH of the water is lower than a preset minimum, and a dispenser, wherein the apparatus is configured to receive commands from at least one user device, and wherein the commands include a desired minimum TDS or pH of dispensed water and/or a desired maximum TDS or pH of the dispensed water.

In another embodiment, the present invention is directed to a system for dispensing alkaline water and tracking water consumption, including an apparatus for dispensing water in network communication with at least one user device, wherein the apparatus for dispensing water includes a water inlet and/or storage tank, a mineral infuser system connected to the water inlet and/or storage tank, wherein the mineral infuser system includes at least one bioceramic material, at least one total dissolved solids (TDS) sensor and/or at least one pH sensor configured to determine TDS and/or pH of water exiting the mineral infuser system, at least one volumetric flow meter configured to detect a volume of water dispensed by the apparatus, and a dispenser, wherein the apparatus is configured to transmit the volume of water dispensed by the apparatus to the at least one user device.

In yet another embodiment, the present invention is directed to a system for dispensing alkaline water and tracking water consumption, including an apparatus for dispensing water in network communication with at least one user device, wherein the apparatus for dispensing water includes a water inlet and/or storage tank, at least one pre-filtration device and at least one reverse osmosis device configured to filter and process water entering the system, a mineral infuser system connected to the water inlet and/or storage tank, wherein the mineral infuser system includes at least one bioceramic material, at least one total dissolved solids (TDS) sensor and/or at least one pH sensor configured to determine TDS and/or pH of water exiting the mineral infuser system, at least one valve configured to recirculate water exiting the mineral infuser system back into the mineral infuser system if the TDS and/or the pH of the water is lower than a preset minimum, and a dispenser, wherein the mineral infuser system includes at least one vortex chamber configured to generate a vortex of incoming water over the at least one bioceramic material, wherein the apparatus is configured to receive commands from at least one user device, and wherein the commands include a desired minimum TDS or pH of dispensed water and/or a desired maximum TDS or pH of the dispensed water, and wherein the at least one valve is configured to selectively receive uninfused water to mix with the water exiting the mineral infuser system if the TDS and/or the pH of the water is greater than a preset maximum.

These and other aspects of the present invention will become apparent to those skilled in the art after a reading of the following description of the preferred embodiment when considered with the drawings, as they support the claimed invention.

DETAILED DESCRIPTION

Figure 1A:
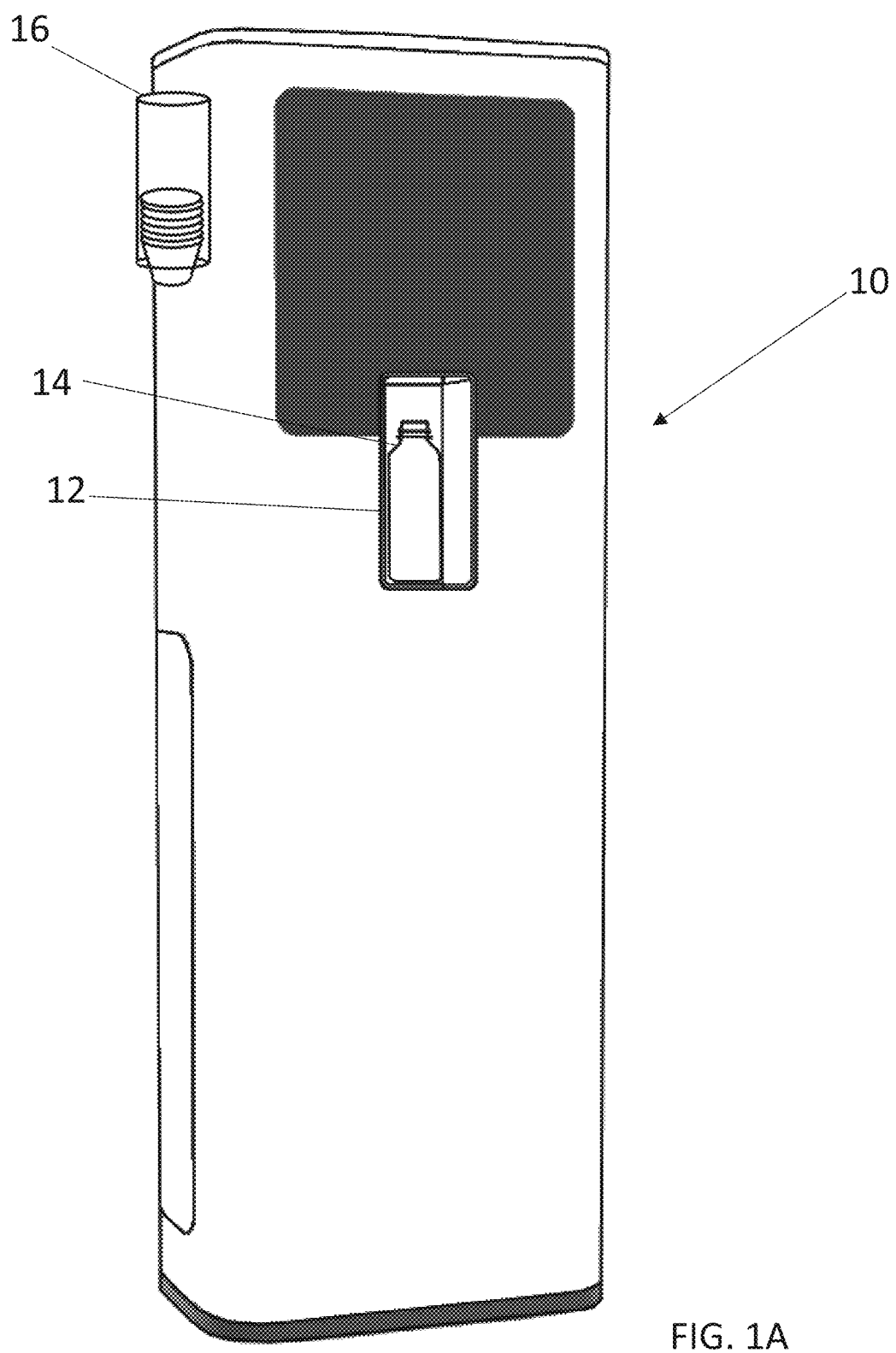
FIG. 1A illustrates a perspective view of a standing water dispensing station according to one embodiment of the present invention.

The present invention is generally directed to devices for dispensing alkaline water, and more specifically to devices including functionality for tracking water consumption.

In one embodiment, the present invention is directed to an apparatus for dispensing water and tracking water consumption, including a water inlet and/or storage tank, a mineral infuser system connected to the water inlet and/or storage tank, wherein the mineral infuser system includes at least one bioceramic material, at least one total dissolved solids (TDS) sensor and/or at least one pH sensor configured to determine TDS and/or pH of water exiting the mineral infuser system, at least one valve configured to recirculate water exiting the mineral infuser system back into the mineral infuser system if the TDS and/or the pH of the water is lower than a preset minimum, and a dispenser, wherein the apparatus is configured to receive commands from at least one user device, and wherein the commands include a desired minimum TDS or pH of dispensed water and/or a desired maximum TDS or pH of the dispensed water.

In another embodiment, the present invention is directed to a system for dispensing alkaline water and tracking water consumption, including an apparatus for dispensing water in network communication with at least one user device, wherein the apparatus for dispensing water includes a water inlet and/or storage tank, a mineral infuser system connected to the water inlet and/or storage tank, wherein the mineral infuser system includes at least one bioceramic material, at least one total dissolved solids (TDS) sensor and/or at least one pH sensor configured to determine TDS and/or pH of water exiting the mineral infuser system, at least one volumetric flow meter configured to detect a volume of water dispensed by the apparatus, and a dispenser, wherein the apparatus is configured to transmit the volume of water dispensed by the apparatus to the at least one user device.

In yet another embodiment, the present invention is directed to a system for dispensing alkaline water and tracking water consumption, including an apparatus for dispensing water in network communication with at least one user device, wherein the apparatus for dispensing water includes a water inlet and/or storage tank, at least one pre-filtration device and at least one reverse osmosis device configured to filter and process water entering the system, a mineral infuser system connected to the water inlet and/or storage tank, wherein the mineral infuser system includes at least one bioceramic material, at least one total dissolved solids (TDS) sensor and/or at least one pH sensor configured to determine TDS and/or pH of water exiting the mineral infuser system, at least one valve configured to recirculate water exiting the mineral infuser system back into the mineral infuser system if the TDS and/or the pH of the water is lower than a preset minimum, and a dispenser, wherein the mineral infuser system includes at least one vortex chamber configured to generate a vortex of incoming water over the at least one bioceramic material, wherein the apparatus is configured to receive commands from at least one user device, and wherein the commands include a desired minimum TDS or pH of dispensed water and/or a desired maximum TDS or pH of the dispensed water, and wherein the at least one valve is configured to selectively receive uninfused water to mix with the water exiting the mineral infuser system if the TDS and/or the pH of the water is greater than a preset maximum.

It is generally known in the prior art to provide water filtration and purification. Water treatment commonly begins with a pretreatment step, usually including screen filtration for eliminating large debris (e.g., sticks, leaves, etc.) and pre-chlorination to prevent colony growth in the filtration system. After pre-filtration, pH treatment is often used to either raise or lower the pH of the incoming water, depending on the source. For example, for acidic water, which is common in acid rain and wells receiving runoff from acid rain, lime, calcite, magnesium oxide, soda ash, or sodium hydroxide are commonly used to increase the water hardness. Alternatively, degasifiers are used to remove carbon dioxide from the water and therefore raise the pH. These methods are preferably used to either neutralize the water (i.e., set the pH near to 7) or to make the water slightly alkaline (e.g., a pH of approximately 7.5). This is useful, as long-term exposure to acidic water frequently damages pipes and acidic water is more likely to leech potentially harmful heavy metals, such as lead. Alternatively, if the incoming water is alkaline, which is frequently the case for sea water, then acidic additives are frequently used to soften the water, such as carbonic acid, hydrochloric acid, or sulfuric acid.

After pre-treatment, many treatment methods employ a filtration dedicated to removing suspended particulates from the water. One method of filtering suspended particulates moves water through a sediment filter, which sometimes includes a layer of activated carbon. As the water moves through the sediment, particles become trapped in the pores of the filter, cleaning the water. Alternatively, other methods utilize selectively permeable membranes, which help to filter out particulates, including parasites, from the water.

While filtration is useful for filtering out solid particulates, it does not eliminate dissolved solids within the water. For dissolved solids, softeners are frequently used. Softeners seek to eliminate minerals from water (e.g., calcium and magnesium ions) by treating the water with lime, soda ash, or other softeners in order to precipitate calcium carbonate or other precipitates. Alternatively, electrodeionization (EDI) is able to used, which runs water through opposite charged electrodes, with ion-exchange membranes splitting positively charged ions from negatively charged ions in the water, allowing for almost complete elimination of ions from the water. This technique is commonly paired with reverse osmosis as a polishing technique.

Additionally, the use of disinfectants is common in treating water to eliminate organic matter. Disinfectants include chemical disinfectants, such as chlorine, chlorine dioxide, chloramine, or ozone, and radiative disinfectants, such as ultraviolet (UV) light, X-rays, or gamma rays. Additionally, some purification techniques subject water to high levels of heat in order to kill microorganisms and denature potentially harmful toxins or use activated carbon to adsorb potentially harmful compounds in the water.

One important feature of some water purification processes is reverse osmosis. Reverse osmosis utilizes a semi-permeable membrane, with water with a higher concentration of contaminants on one side of the semi-permeable membrane and water with a lower concentration of contaminants on the other side of the semi-permeable membrane. Unlike in osmosis, a pressure is applied to counteract the osmotic pressure and force water from the side with higher concentration of contaminants to the side with a lower concentration. Reverse osmosis itself often comprises several different layers of filtration, including a sediment filter for larger particulates, a first carbon filter for attracting smaller particulates and positively charged ions (e.g., chlorine), a reverse osmosis membrane for removing molecules heavier than water (e.g., sodium, lead, dissolved minerals, and fluoride), and a second carbon filter for polishing the water. Reverse osmosis is capable of much greater filtration than, for example, carbon filtration, as it is able to remove particles as small as 0.001 microns, rather than 1 micron, as with carbon filtration.

Different methods of making alkaline drinking water have been proposed. For example, some common home remedies include adding small amounts of baking soda and lemon juice to water. Alternatively, under-sink water ionizers, such as the MXL series offered by LIFE IONIZER, instead focus on utilizing electrolysis to separate water streams into acidic and alkaline components. Alternatively, other methods increase mineral concentration in water following reverse osmosis purification using remineralizers, which increase the total dissolved solids (TDS) in the water using calcium, calcite, and/or coconut shell carbon filters (alternatively, lime or caustic soda are sometimes added for remineralization). While remineralizers typically do not significantly change pH themselves, remineralizers are commonly paired with ionizers in order to increase the pH. Some systems, such as the OMYAQUA system utilize calcium carbonate stones and run water across the calcium carbonate stones in order to remineralize and increase the pH of the water.

In addition to municipal remineralizers commonly paired with reverse osmosis systems, countertop remineralizing filters have begun to be sold in recent years. For example, SANTEVIA markets the PURE EARTH WATER SYSTEM, which runs water over natural Maifan stones in order to reinfuse calcium, iron, magnesium, potassium, zinc, and other materials into the water. These systems typically function as passive systems, with the water passing over the stones a single time and being infused with whatever quantity of minerals is able to pass into the water with a single pass-through.

None of the prior art discloses systems capable of tracking a user's water consumption over time. While devices such as the FITBIT or APPLE WATCH commonly track a user's vitals, these systems do not monitor an actual amount of water consumed by a user. While some web sites allow for manually entering in hydration information, these systems are unable to automatically track the actual amount consumed and often rely on user estimation of water quantities. Additionally, hydration sensors such as the HDROP, are able to monitor dehydration through detecting temperature and sweat, but these systems are largely limited to fitness applications and are not suited for monitoring hydration of individuals in non-active situations. Furthermore, hydration sensors are unable to determine the source or nature (e.g., pH) of the water consumed and therefore have more limited information. Therefore, what is needed is a system to accurately monitor water consumption by a user.

Referring now to the drawings in general, the illustrations are for the purpose of describing one or more preferred embodiments of the invention and are not intended to limit the invention thereto.

In one embodiment, the present invention includes a server platform, including a processor and a memory, associated with at least one database. The server platform generates user profiles, each associated with at least one radiofrequency identification (RFID) chip. The at least one RFID chip is attached to or embedded in, for example, a water bottle, a wearable device, an article of clothing, or any other object. Upon the RFID chip being detected, an external processor is configured to transmit data to the server platform including, by way of example and not limitation, a time at which water was dispensed, a geolocation of where water was dispensed, an amount of water dispensed, a pH of water dispensed, a temperature of water dispensed, environmental temperature, and/or other information.

In one embodiment, the water bottle includes one or more sensors capable of detecting a hydration status of a user associated with the water bottle and automatically reporting the hydration status to a server to automatically update a user profile associated with the user. In one embodiment, the one or more sensors include volume sensors, able to determine a total volume of water in the bottle over time, differences in which are considered to have been consumed by the user. This volume data is then able to be used, along with an approximate user weight and/or manually entered exercise data associated with the user profile to determine a hydration status of the user over time. In another embodiment, the one or more sensors include analyte sensors (e.g., sweat sensors).

In one embodiment, the inner surface of the water bottle includes one or more water quality sensors. In one embodiment, the one or more water quality sensors includes one or more total dissolved solids (TDS) sensors, able to be determined a total number of alkaline ions present in the water. In another embodiment, the one or more water quality sensors includes one or more pH sensors, one or more residual chlorine sensors, one or more turbidity sensors, one or more dissolved oxygen sensors, one or more oxidation-reduction potential (ORP) sensors, one or more algae sensors, and/or one or more chemical oxygen demand (COD) sensors.

FIG. 1A illustrates a standing water dispensing station according to one embodiment of the present invention. The standing water dispensing station 10 is particularly suited for, though not exclusively suited for, use in a fitness center or gym, and provides the ability to both receive healthy water (e.g., alkaline water) for rehydrating and to track water consumption over periods of time via connection to a user profile. A standing water dispensing station 10 includes a recess 12 configured to receive a water container 14 (e.g., a water bottle). The recess 12 further includes at least one nozzle configured to dispense water (e.g., alkaline water, neutral water, etc.) into the water container. In one embodiment, the pH of the water is approximately 7.5, approximately 8, approximately 8.5, approximately 9, approximately 9.5, or approximately 10. In one embodiment, the standing water dispenser includes at least one pH sensor, operable to generate pH data for the water dispensed from the standing water dispensing station 10. In one embodiment, the standing water dispenser includes at least one temperature sensor, operable to generate temperature data for water dispensed from the standing water dispensing station 10. In one embodiment, the standing water dispenser includes at least one total dissolved solids (TDS) sensor, operable to generate TDS data for water dispensed from the standing water dispensing station 10.

In one embodiment, the standing water dispensing station 10 includes at least one replaceable water container within the standing water dispensing station 10. In another embodiment, water entering the standing water dispensing station 10 enters the standing water dispensing station 10 through a water service line, preferably a water service line wherein the water has been filtered and mineralized such that the pH of the water is greater than 7.

In a preferred embodiment, the recess 12 is positioned approximately 4 feet from ground level, but one of ordinary skill in the art will understand that the recess 12 is able to be positioned at any relevant position on the standing water di spending station 10. One of ordinary skill in the art will understand that the standing water dispensing station 10 is not limited to having a single recess 12 and is able to include multiple recesses for filling multiple water containers simultaneously.

In one embodiment, the recess 12 includes at least one radiofrequency identification (RFID) chip reader or sensor. The at least one RFID chip reader is configured to detect at least one RFID chip attached to or embedded in the water container 14. In one embodiment, the standing water dispensing station includes a processor configured to transmit information (e.g., geolocation information, amount of water dispensed, time, pH of water dispensed, temperature of water dispensed, etc.) to the server platform. The server platform then updates a user profile associated with the at least one RFID chip reader and is able to display statistics regarding an individual user's water consumption over time on a computer or mobile application. Statistics generated by the server platform include, but are not limited to, amount of water consumed today, amount of water consumed over a past time period, amount of alkaline water consumed today, amount of alkaline water consumed over a past time period, average pH of consumed water, average temperature of consumed water, at least one chart showing amount of water consumed over time (e.g., each hour, each day, each week, each month, etc.), average time(s) of day when water is most often consumed, at least one location map of water dispensing stations a user has visited, and/or other information regarding water consumption.

In one embodiment, the standing water dispensing station 10 requires the use of monetary funds in order to pay for the dispensing of the water. In one embodiment, the standing water dispensing station 10 includes at least one card reader configured to receive a credit card, debit card, gift card, or other payment card to pay for the dispensed water. In another embodiment, a user profile is associated with at least one payment method. When an RFID chip associated with at least one user is detected by the RFID chip scanner, the server platform automatically charges the at least one associated payment method for the amount of water dispensed.

In one embodiment, the standing water dispensing station 10 includes a water cup dispenser 16, configured to provide disposable water cups for use in the standing water dispensing station 10. In one embodiment, the water cup dispenser 16 includes at least one RFID chip sensor, configured to automatically detect an RFID chip held by a user (e.g., in a wearable device, in a mobile phone, etc.). In one embodiment, the server platform automatically charges at least one payment method associated with a user profile associated with the scanned RFID chip for the price of each disposable water cup used.

Figure 1B:
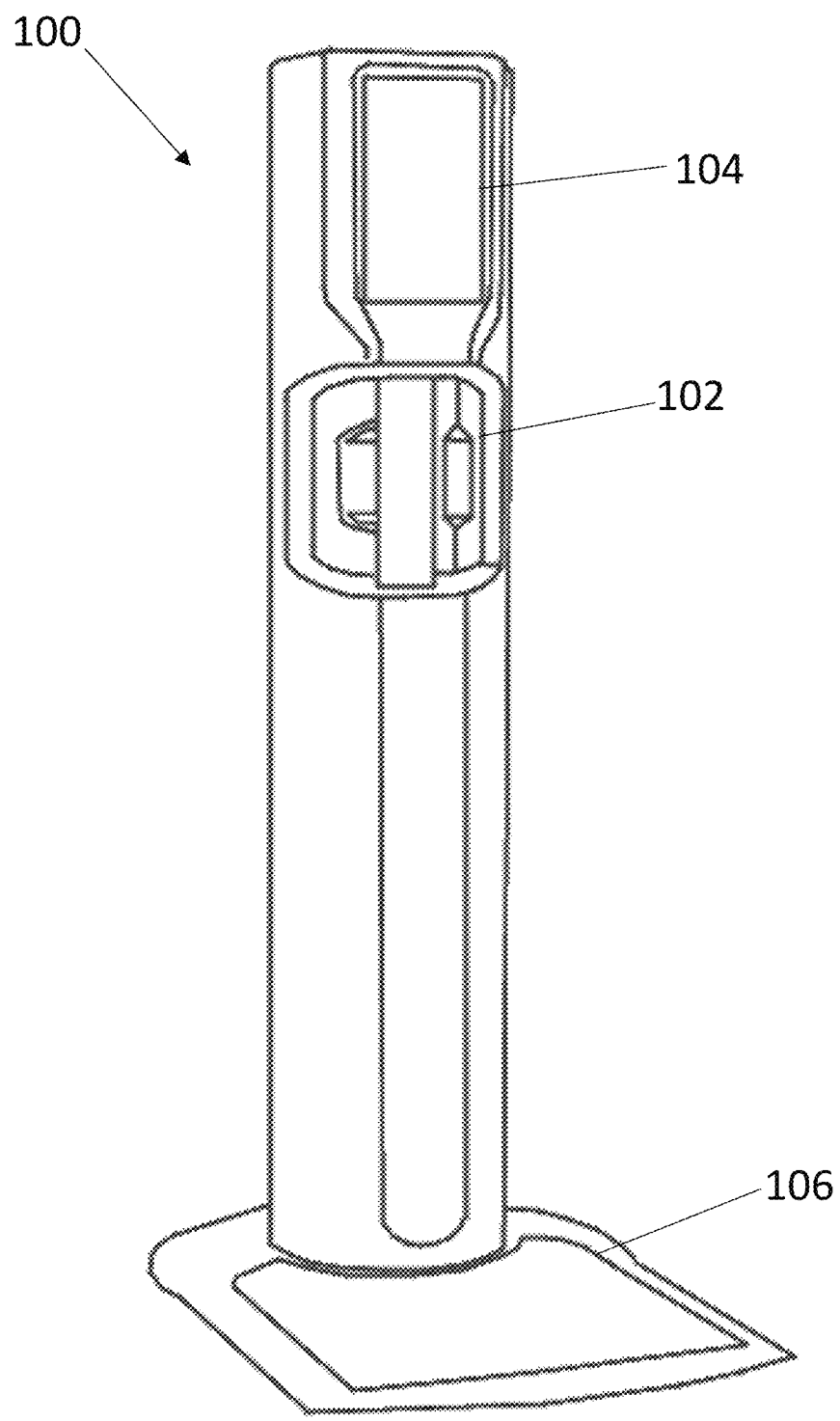
FIG. 1B illustrates a perspective view of a standing water dispensing station according to another embodiment of the present invention.

FIG. 1B illustrates a standing water dispensing station according to another embodiment of the present invention. In one embodiment, a standing water dispensing station 100 includes a recess 102, a display screen 104, and a platform 106. The recess 102 is configured to receive a water container (e.g., a water bottle) and dispense water into the water container. In one embodiment, as shown in FIG. 1B, the recess 102 includes a cover. In one embodiment, the cover includes at least one handle and is operable to be rotated such that the recess 102 is accessible.

In one embodiment, the standing water dispensing station 100 includes a display screen 104. The display screen 104 is configured to display information regarding the water being dispensed, including, but not limited to, the pH of the water, the temperature of the water, the total dissolved solids (TDS) concentration of the water, and/or the amount of water being dispensed. In one embodiment, the display screen 104 is configured to display data associated with the user profile, including, but not limited to, an amount of water consumed over a period of time or progression toward a user goal for water consumption (e.g., 1 out of 4 liters consumed). In one embodiment, the display screen 104 is a touch screen. In one embodiment, the display screen 104 is a liquid crystal display (LCD) screen, a light-emitting diode (LED) display screen (e.g., an organic LED (OLED) display screen), a plasma display screen, and/or any other type of display screen known in the art.

In one embodiment, the standing water dispensing station 100 includes a platform 106 for a user to stand on while using the standing water dispensing station 100. In one embodiment, the platform 106 includes a scale, configured to weigh the user and generate weight data. In one embodiment, the platform 106 automatically updates the user profile based on the weight data.

Figure 2:
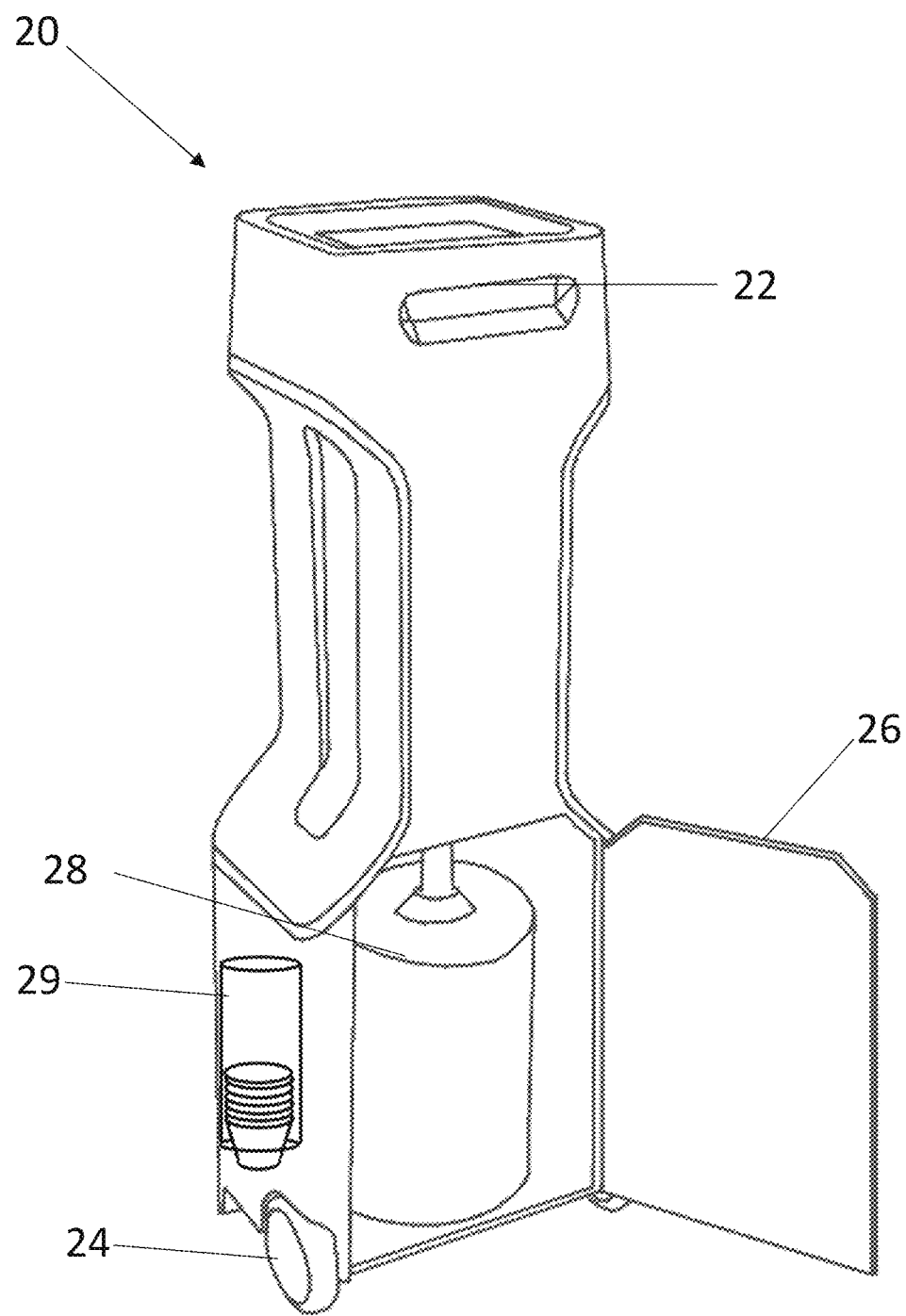
FIG. 2 illustrates a perspective view of a mobile water carrying station according to one embodiment of the present invention.

FIG. 2 illustrates a mobile water carrying station according to one embodiment of the present invention. The mobile water carrying station 20 is particularly useful for physical therapy offices or other health facilities where users are frequently not easily able to move. Therefore, a physical therapist is able to easily transport water container to the patient in order to help the patient rehydrate. The mobile water carrying station 20 includes a base housing for at least one water container 28 and a stem region rising upwardly from the base housing. In one embodiment, the base housing includes a plurality of wheels 24, enabling the mobile water carrying station 20 to be moved around more easily. In one embodiment, the base housing includes at least one door 26 pivotably attached to the base housing and able to close so as to retain the at least one water container 28 within the base housing. In one embodiment, the at least one door 26 includes a locking mechanism operable to lock the at least one door 26 in a closed position. In one embodiment, the at least one water container 28 includes alkaline water (e.g., pH of about 7.5, pH of about 8, pH of about 8.5, pH of about 9, pH of about 9.5, pH of about 10, etc.).

In one embodiment, the mobile water carrying station 20 includes a water cup dispenser 29, configured to provide disposable water cups for use with the mobile water carrying station 20. In one embodiment, the water cup dispenser 29 includes at least one RFID chip sensor, configured to automatically detect an RFID chip held by a user (e.g., in a wearable device, in a mobile phone, etc.). In one embodiment, the server platform automatically charges at least one payment method associated with a user profile associated with the scanned RFID chip for the price of each disposable water cup used.

Figure 3:
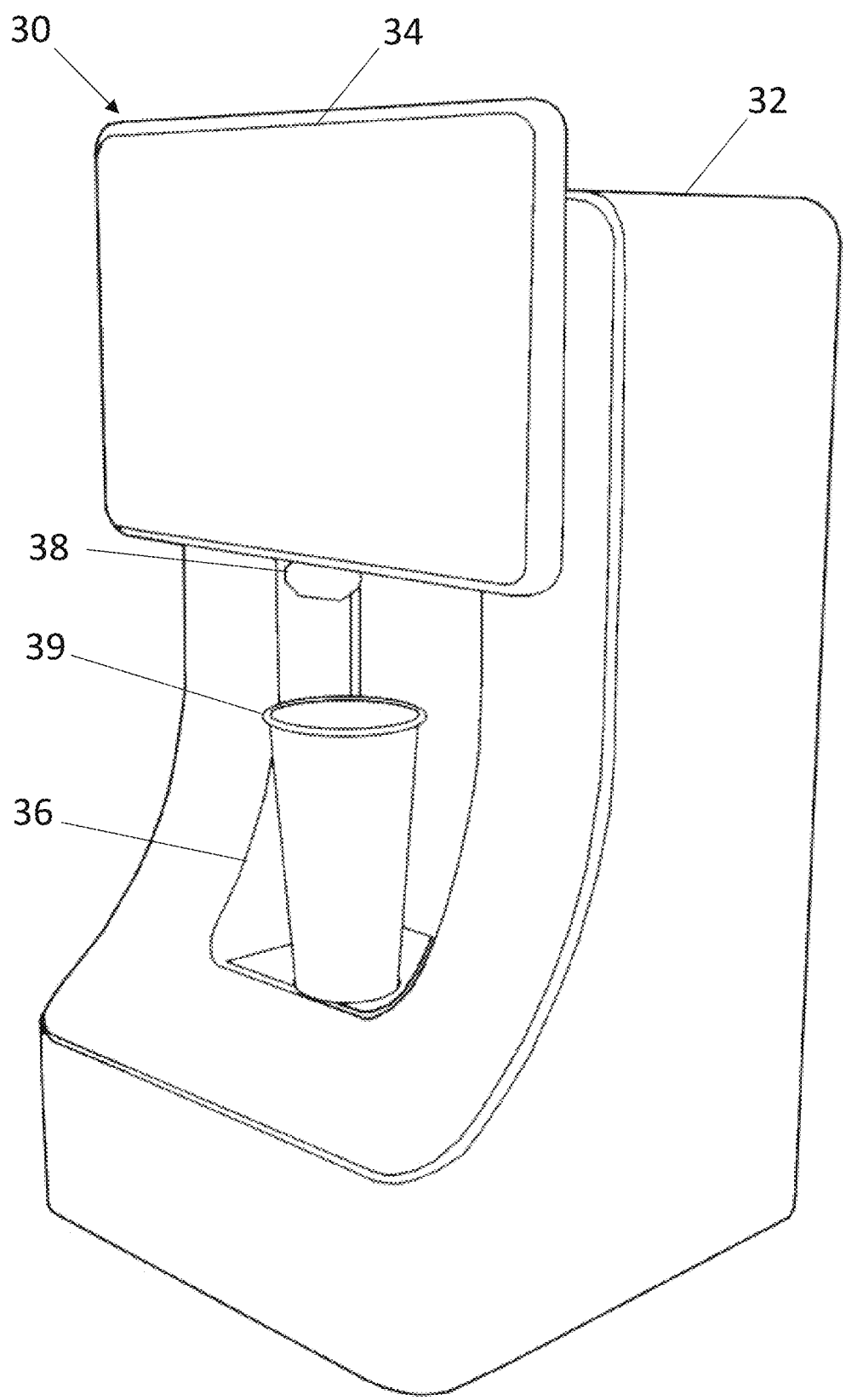
FIG. 3 illustrates a perspective view of a tabletop water dispensing station according to one embodiment of the present invention.

FIG. 3 illustrates a tabletop water dispensing station according to one embodiment of the present invention. A tabletop water dispensing station 30 is able to be used in a variety of scenarios. For example, it is able to be used in hospitals or other work environments for quick and easy water refills, or in a home. The tabletop water dispensing station 30 includes a base 32 including a recess or platform configured to support a water container 39 (e.g., a water bottle, a water cup, etc.). The table top water dispensing station 30 includes at least one water dispenser 38 configured to dispense water (e.g., alkaline water) into the water container 39.

In one embodiment, the tabletop water dispensing station 30 includes at least one display screen 34 attached to and extending outwardly from a front face of the base 32. The display screen 34 is configured to display information regarding the water being dispensed, including, but not limited to, the pH of the water, the temperature of the water, the total dissolved solids (TDS) concentration of the water, and/or the amount of water being dispensed. In one embodiment, the display screen 34 is configured to display data associated with the user profile, including, but not limited to, an amount of water consumed over a period of time or progression toward a user goal for water consumption (e.g., 1 out of 4 liters consumed). In one embodiment, the display screen 34 is a touch screen.

Figure 4:
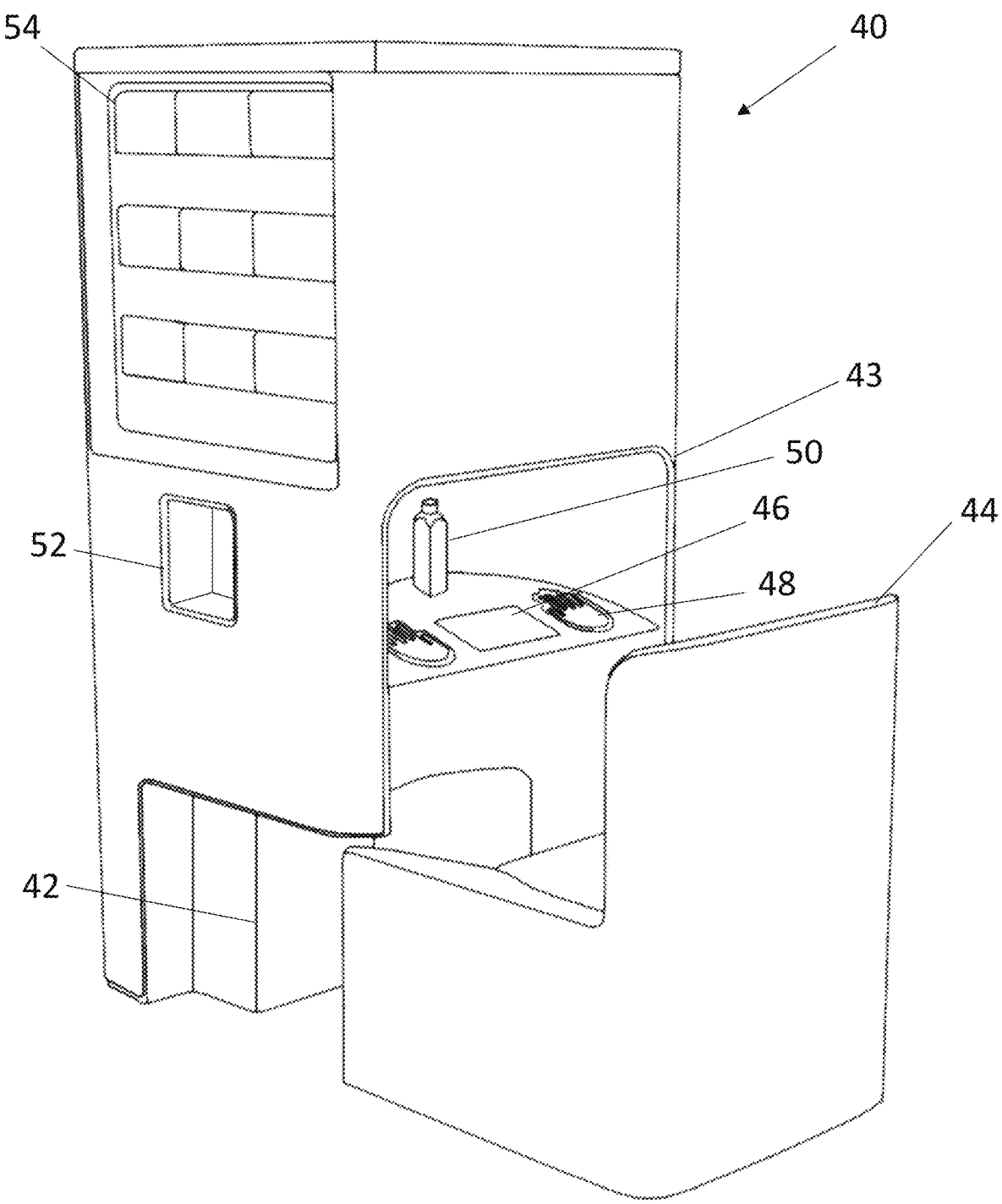
FIG. 4 illustrates a perspective view of a sit-down water dispensing station according to one embodiment of the present invention.

FIG. 4 illustrates a sit-down water dispensing station according to one embodiment of the present invention. The sit-down water dispensing station 40 is particularly useful in a pharmacy or any other environment wherein users want to receive water and receive health information regarding their water consumption. In one embodiment, the bottom of the sit-down water dispensing station 40 includes a carve out area 42 configured to receive a user's legs and configured to matingly fit at least one corresponding seat 44. In one embodiment, the at least one corresponding seat 44 includes at least one built-in scale for measuring the weight of the user.

The sit-down water dispensing station 40 includes at least one recess 43 including a display panel 46 and a holder for retaining at least one water container 50. In one embodiment, the holder for the at least one water container 50 is positioned such that the at least one water container 50 is directly below at least one faucet and therefore the system is able to fill the at least one water container 50.

The display panel 46 is a screen for displaying information regarding a user's water consumption habits, information regarding dispensed water, and/or educational information regarding hydration and/or the benefits of alkaline water. The display panel 46 is configured to display information regarding the water being dispensed, including, but not limited to, the pH of the water, the temperature of the water, the total dissolved solids (TDS) concentration of the water, and/or the amount of water being dispensed. In one embodiment, the display panel 46 is configured to display data associated with the user profile, including, but not limited to, an amount of water consumed over a period of time or progression toward a user goal for water consumption (e.g., 1 out of 4 liters consumed). In one embodiment, the display panel 46 is a touch screen.

In one embodiment, the sit-down water dispensing station 40 includes at least one biometric sensor 48 configured to generate biometric data. In one embodiment, as shown in FIG. 4, the at least one biometric sensor 48 includes at least one fingerprint or handprint sensor. In one embodiment, the sit-down water dispensing station 40 transmits the biometric data to the server platform. The server platform then matches the biometric data to biometric data associated with a user profile in order to update the user profile with water consumption information and/or to receive information regarding the user profile to display on the display panel 46.

In one embodiment, the sit-down water dispensing station 40 includes at least one water container filling chamber 52. The water container filling chamber 52 includes at least one faucet, receives at least one water container, and automatically fills the at least one water container. In one embodiment, the at least one water container is a large container (e.g., holds approximately 4.25 liters) and fits snugly within the water container filling chamber 52. In one embodiment, the sit-down water dispensing station 40 includes a plurality of water container containment chambers 54. The plurality of water container containment chambers 54 act as storage for additional water containers. Therefore, users are able to approach the sit-down water dispensing station 40, take one of the water containers from the water container containment chambers 54 and then fill the water container within the water container filling chamber 52. In one embodiment, each water container is only removable from the water container containment chamber 54 in which it is housed after payment (e.g., card payment, payment automatically charged to an associated user profile of a scanned RFID chip, etc.) is received by the sit-down water dispensing station 40. In one embodiment, the display panel 46 includes an indication of which water container is able to be accessed and removed from the sit-down water dispensing station 40.

Figure 5A:
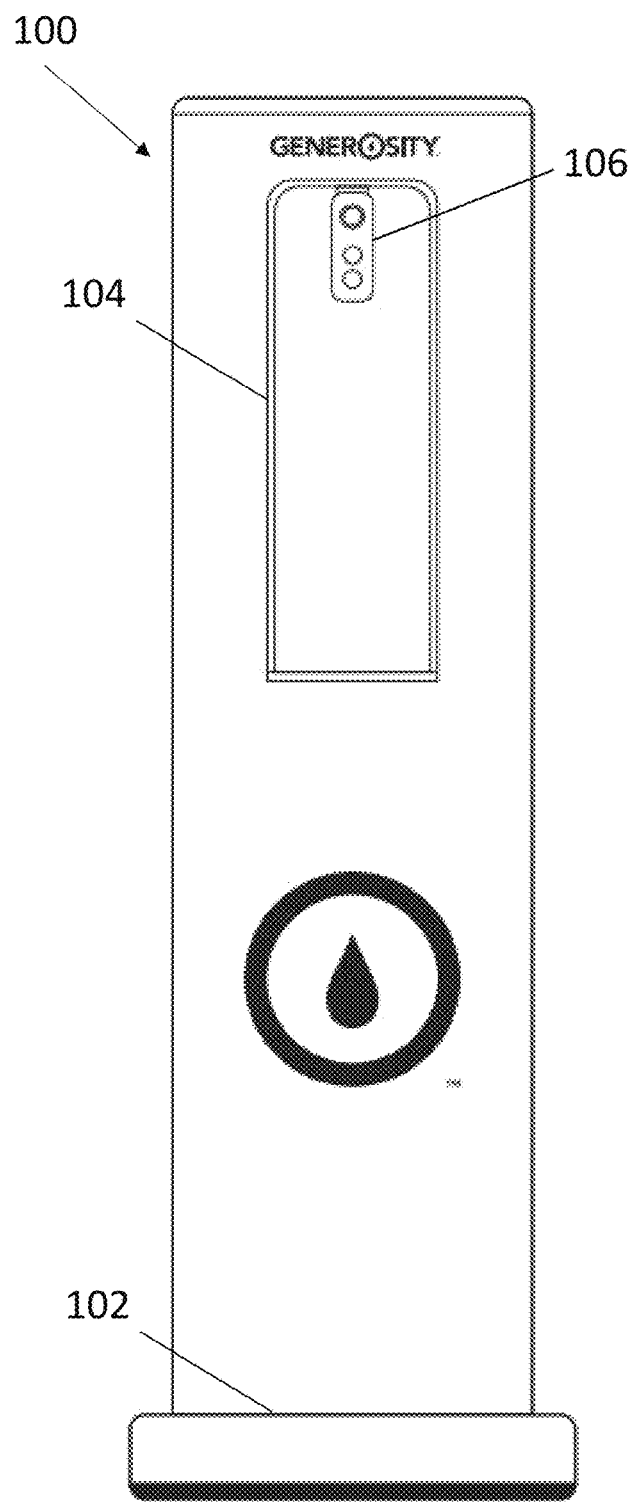
FIG. 5A illustrates an orthogonal front view of a water fountain according to one embodiment of the present invention.
Figure 5B:
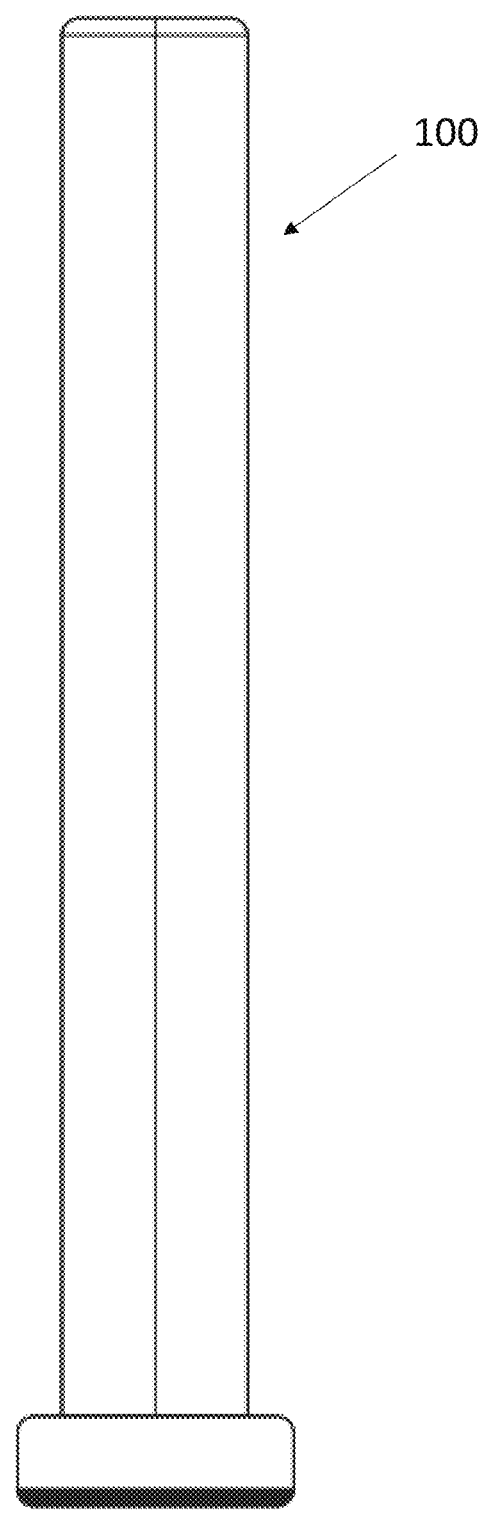
FIG. 5B illustrates an orthogonal side view of the water fountain of FIG. 5A.

FIGS. 5A-5B illustrate a water fountain according to one embodiment of the present invention. In one embodiment, a water fountain 110 sits atop a substantially flat base 102 and includes a recess 104 for receiving at least one water bottle. At least one water dispenser 106 extends downwardly from a top inner surface of the recess 104 and is able to be activated, either via activation of at least one button or other control directly on the water fountain, or via wireless communication by at least one user device. The at least one water dispenser 106 is therefore capable of filling, partially or completely, an inserted water bottle in the recess 104.

Figures 6A, 6B:
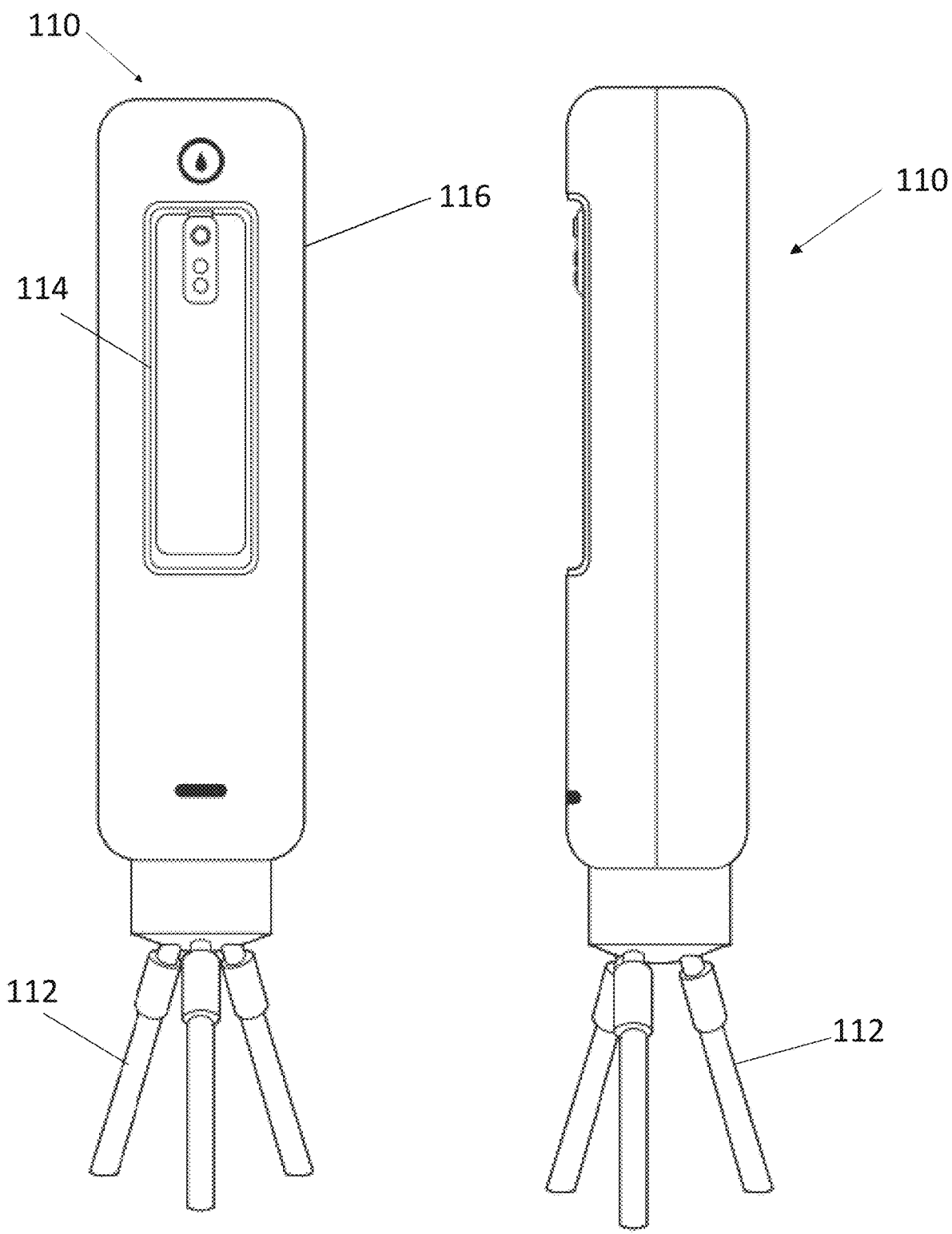
FIG. 6A illustrates an orthogonal front view of an intelligent dispenser according to one embodiment of the present invention.
FIG. 6B illustrates an orthogonal side view of the intelligent dispenser of FIG. 6A.

FIGS. 6A-6B illustrate an intelligent dispenser according to one embodiment of the present invention. In another embodiment, an intelligent dispenser 110 is supported by one or more legs 112. In one embodiment, the intelligent dispenser 110 is a tripod system having three legs 112, but one of ordinary skill in the art will understand that the number of legs able to support the system is able to be varied. In one embodiment, the intelligent dispenser 110 includes a recess 114 operable to receive at least one water bottle. At least one water dispenser 116 extends downwardly from a top inner surface of the recess 114 and is able to be activated, either via activation of at least one button or other control directly on the intelligent dispenser, or via wireless communication by at least one user device. The at least one water dispenser 116 is therefore capable of filling, partially or completely, an inserted water bottle in the recess 114.

Figure 7A:
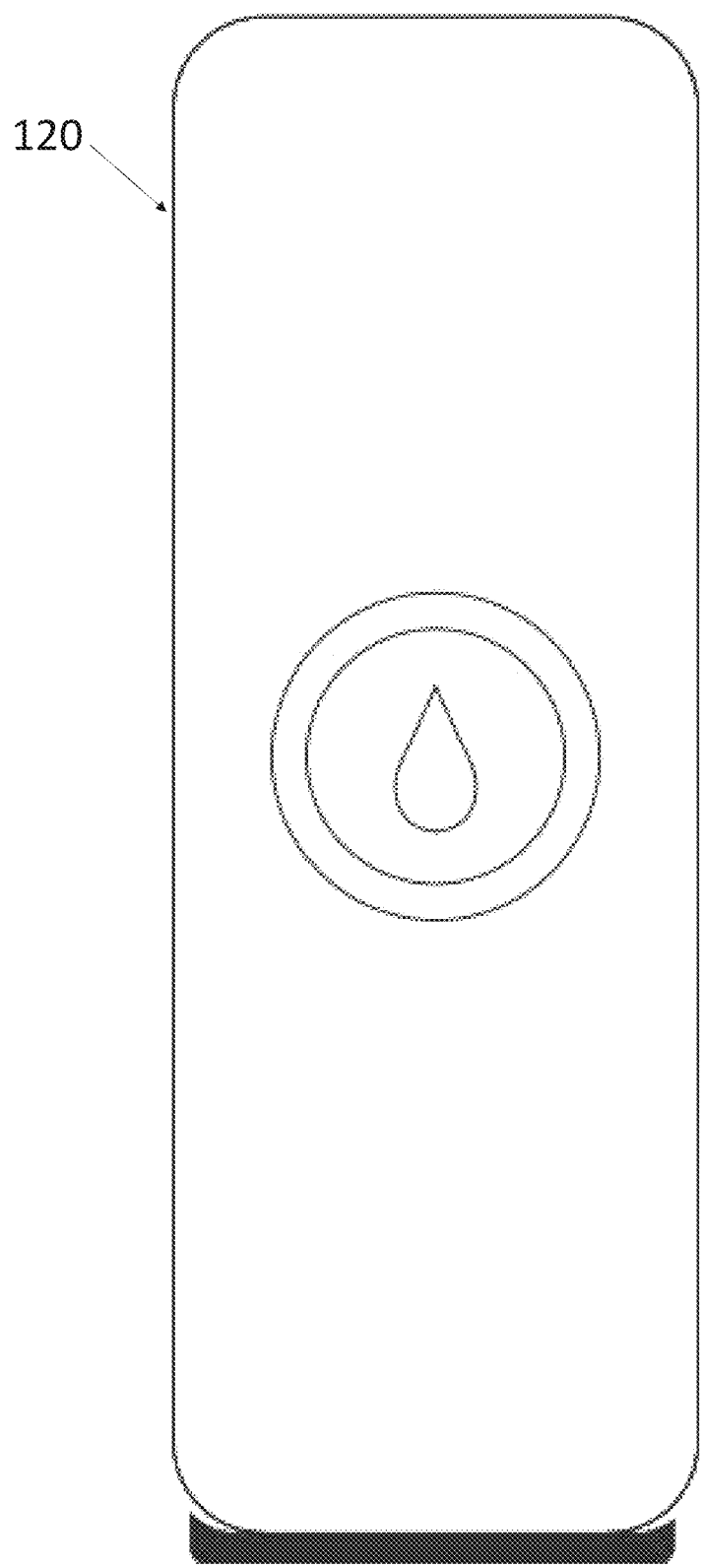
FIG. 7A illustrates an orthogonal front view of a home water unit according to one embodiment of the present invention.
Figure 7B:
FIG. 7B illustrates an orthogonal side of the home water unit of FIG. 7A.

FIGS. 7A-7B illustrate a home water unit according to one embodiment of the present invention. In one embodiment, a water filtration and/or mineral infusion system (e.g., those systems discussed below in FIGS. 8-11) is contained within a sleek shell enclosure 120. In one embodiment, the enclosure 120 is shaped substantially like a rectangular prism. The embodiment shown in FIGS. 7A-7B is designed specifically for use in homes and is able to be adapted to have inlets and outlets for integration into an under sink system, or a faucet for acting as a countertop water dispenser.

Figure 8:
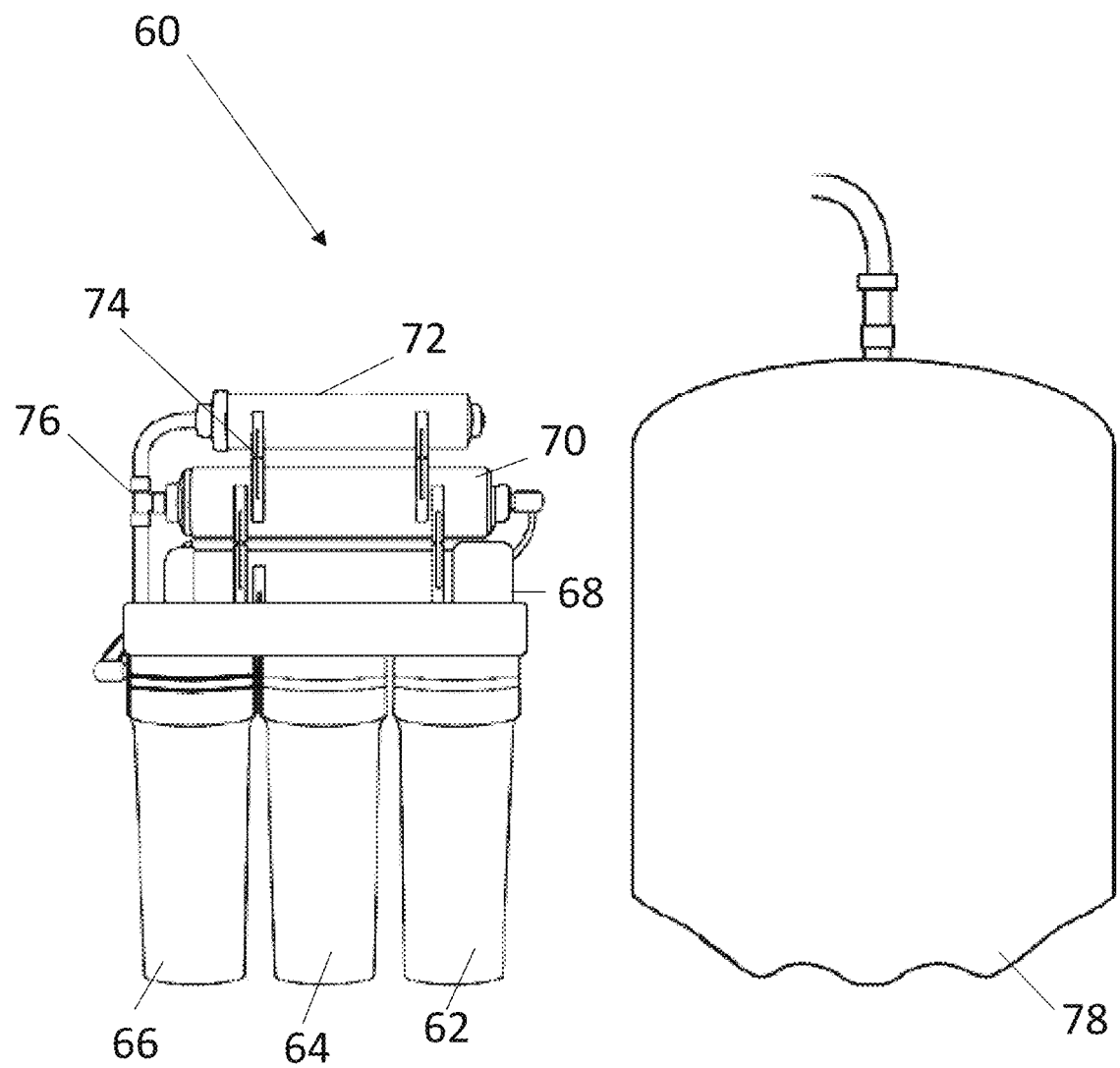
FIG. 8 illustrates a below-sink reverse osmosis filtration and mineral infusion unit according to one embodiment of the present invention.
Figure 9:
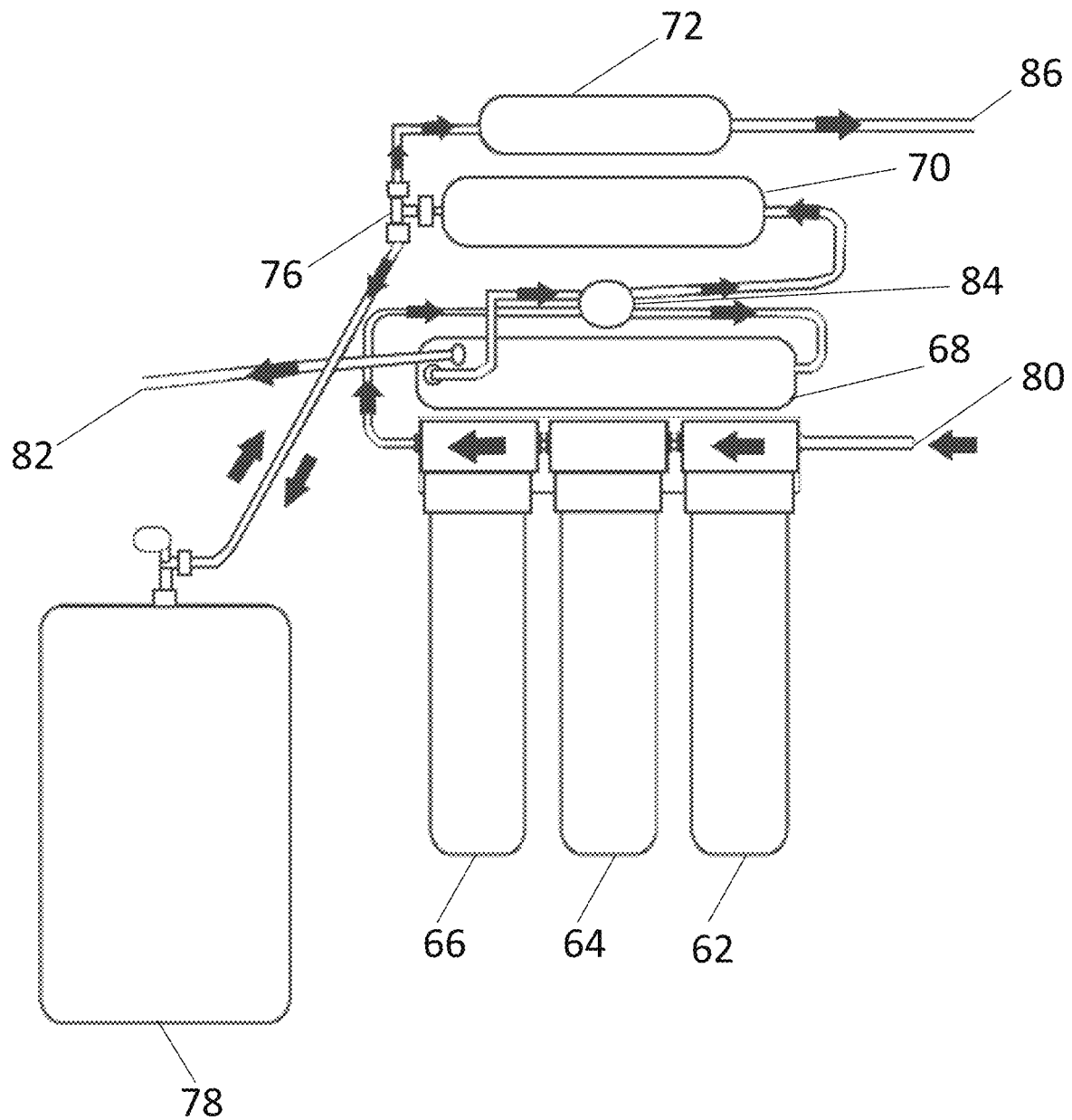
FIG. 9 illustrates a below-sink reverse osmosis filtration and mineral infusion unit including a designation of a water flow path according to one embodiment of the present invention.

FIGS. 8-9 illustrates a below-sink reverse osmosis filtration and mineral infusion unit according to one embodiment of the present invention. The reverse osmosis filtration and mineral infusion unit is specially adapted for, though not limited to use with, sink units, and is able to directly connect to water inlet, water drainage, and water outlet/faucet lines of a sink unit in order to provide additional filtration to the water and to increase the alkalinity of the water. Water enters into the reverse osmosis filtration and mineral infusion unit from an external source (e.g., a municipal water line, a well water line, a spring water line, etc.). The water enters a plurality of microfilters 62, 64, 66 configured to filter out particulates and dissolved compounds from an incoming water stream. In one embodiment, the plurality of microfilters 62, 64, 66 includes at least one sediment filter 62 and at least one pre-carbon filter 64, 66. In one embodiment, the system includes at least one ultraviolet filtration filter (e.g., UV-C filtration filter) for eliminating microbes and other harmful biological agents. After pass through the plurality of microfilters 62, 64, 66, the water enters a reverse osmosis chamber 68 including a reverse osmosis membrane for ultrapurifying the water and removing up to about 99.5% of dissolved solids from the water. Some amount of the water, containing higher concentrations of dissolved solids is then removed from the system with a drainage line 82. In one embodiment, the drainage line 82 is configured to connect to a sewage line of a building. In one embodiment, the system includes one or more booster pumps configured to increased water pressure of the water in the system. This is particularly valuable when placed in front of the reverse osmosis chamber 68, in order to ensure that the water has increased pressure when entering the reverse osmosis chamber 68.

When the water exits the reverse osmosis chamber 68, the water enters a mineral infusion chamber 70. In one embodiment, the mineral infusion chamber 70 includes a plurality of bioceramic components (e.g., bioceramic balls). In one embodiment, the bioceramic components include calcium carbonate, calcite, and/or other alkaline compounds. In one embodiment, the plurality of bioceramic balls or other bioceramic pieces are naturally sourced. In one embodiment, the plurality of bioceramic balls have radii between about ⅛ of an inch and about ⅜ of an inch. In one embodiment, the bioceramic balls are formed from calcium (e.g., sourced from coral and/or pearls) heated to varying temperatures and subsequently mixed with clay. In another embodiment, the bioceramic components are coated to enhance mineralization of the water that contacts them during processing. The water passes over the bioceramic components and quantities of alkaline compounds therefore enter the water, thereby increasing the TDS concentration of the water and the pH of the water. Bioceramic refers to ceramic materials that are biocompatible with the human body and fit for consumption. In one embodiment, the bioceramic materials include natural, marine-sourced bioceramics and not synthetic ceramics. In another embodiment, the bioceramic materials includes at least some synthetic ceramics.

After exiting the mineral infusion chamber 70, the water enters a union tee 76. If there is demand for water outflow from the system, then the water exits the union tee and enters a post-carbon filter 72 before exiting the system to a faucet or other outlet 86. If there is not demand for water outflow from the system, the water enters a containment tank 78 for future use. In one embodiment, if there is water demand, water exists the containment tank 78, enters the post-carbon filter 72, and exists through the faucet or other outlet 86.

In one embodiment, water exiting the plurality of microfilters 62, 64, 66 and/or water existing the reverse osmosis chamber 68 enters an auto shut-off valve 84. The auto shut-off valve 84 automatically prevents water from entering the reverse osmosis chamber 68 and/or the mineral infusion chamber 70 if pressure is too great.

In one embodiment, the post-carbon filter 72, the mineral infusion chamber 70, the reverse osmosis chamber 68, and the plurality of microfilters 62, 64, 66 are arranged in a vertically stacked orientation, as shown in FIG. 8. In one embodiment, the post-carbon filter 72, the mineral infusion chamber 70, the reverse osmosis chamber 68, and the plurality of microfilters 62, 64, 66 are held together by a plurality of supports 74. For example, in one embodiment, at least one support is attached to the post-carbon filter 72 and to the mineral infusion chamber 70, at least one support is attached to the mineral infusion chamber 70 and the reverse osmosis chamber 68, and at least one support is attached to the reverse osmosis chamber 68 and the plurality of microfilters 62, 64, 66.

Figure 10:
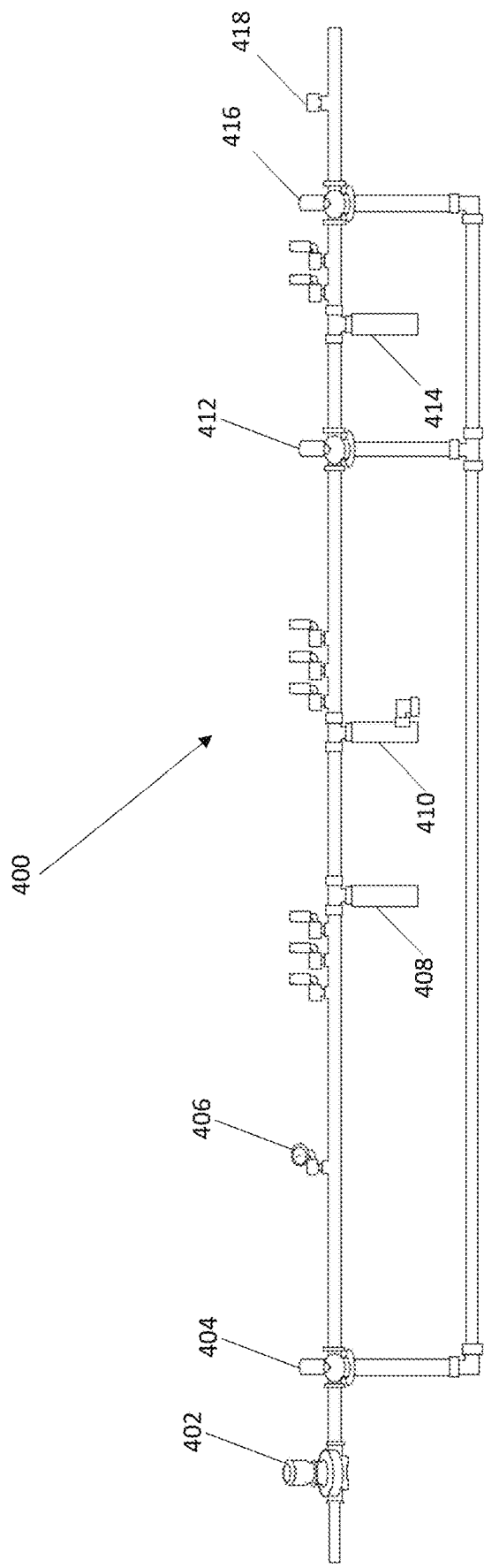
FIG. 10 illustrates a schematic of a water treatment and mineral additive system according to one embodiment of the present invention.

FIG. 10 illustrates a schematic of a water treatment and mineral additive system according to one embodiment of the present invention. FIG. 10 illustrates one version of a water treatment and mineral additive system 400 in which the water is pumped by a first pump 402 before passing through a valve 404 to enter a water treatment section, where impurities in the water are removed. In one embodiment, the valve 404 is a mixing or diverter valve capable of mixing incoming water with processed water exiting the reverse osmosis system 410 based on readings from pressure sensors, pH sensors, chlorine level sensors, total dissolved solids sensors, and/or other sensors. In one embodiment, the water treatment section includes at least one pressure sensor 406 configured to detect the water pressure in the system 400. While the system shows the water pressure sensor as being positioned before the pre-filtration 408 and reverse osmosis 410 systems, one of ordinary skill in the art will understand that the system 400 is able to include, in addition to or in lieu of the at least one pressure sensor 406 before the pre-filtration system 408, at least one pressure sensor between the pre-filtration system 408 and reverse osmosis system 410 or after the reverse osmosis system 410. Additionally, while only a single pressure sensor 406 is shown, one of ordinary skill in the art will understand that the system is also capable of including multiple pressure sensors and/or one or more other types of sensors, including at least one chlorine sensor (e.g., an organic photodiode (OPD) sensor), at least one pH sensor, and/or at least one TDS sensor. Output of any of these sensors alone or in combination with readings from other sensors are able to be transmitted to a controller capable of regulating the valve 404 for regulating a quantity of processed water mixed with incoming water into the system 400.

In one embodiment, the pre-filtration system 408 includes at least one sediment filter for removing larger-sized particles, at least one carbon pre-filter (e.g., to remove chlorine and other trace contaminants), at least one ultraviolet-C (UVC) filter, and/or one or more other filters. Preferably, after passing through the pre-filtration system 408 and the reverse osmosis system 410, the water has low enough TDS to enter a mineral infusion section of the system 400. In one embodiment, at least one TDS sensor and/or at least one other sensor measures water exiting the reverse osmosis system 410 and controls at least one valve 412 allowing or preventing water from entering the mineral infusion section.

In one embodiment, after passing through the at least one valve 412 into the mineral infusion section, the water is treated with a mineral infusion system 414. In one embodiment, the at least one valve 412 is operable to regulate a quantity of infused water (i.e., water exiting the mineral infusion system 414) to inject back into the beginning of the mineral infusion section to mix with processed, but not infused water. The amount of infused water to introduce back into the system helps to regulate the overall TDS and/or pH to achieve a desired value. In one embodiment, the mineral infusion section includes at least one TDS sensor and/or at least one pH sensor, wherein the TDS sensor and/or at least one pH sensor detects whether the TDS and/or pH of the water exiting the mineral infusion system 414 are above a preset minimal threshold and below a preset maximum threshold. In one embodiment, readings from the at least one TDS and/or pH sensor in the mineral infusion section are transmitted to at least one controller operable to regulate a valve 416 (and/or the valve 412 to determine amount of infused water to introduce back into the mineral infusion section) to allow or prevent water from exiting from the mineral infusion section to the outflow of the system 400. In one embodiment, the controller is configured to receive updated values for the preset minimal threshold and/or the preset maximum threshold from at least one user device (e.g., a smart phone application, a computer, etc.). This allows selectivity of optimal TDS or pH values depending on a user's individual preferences or dependent on local rules and regulations (e.g., maximum pH regulations).

In one embodiment, if the TDS or pH is higher than desired after passing through the mineral infusion section, the system includes a line (not shown) operable to directly link processed water entering valve 412 into the outflow stream in order to dilute the water as desired.

In one embodiment, the system 400 includes at least one outflow sensor 418 detecting the flow volume and/or flow pressure of the water exiting the system 400. In one embodiment, readings from the at least one outflow sensor 418 are transmitted to at least one outflow controller. In one embodiment, the at least one outflow controller is operable to regulate total amount of water entering the system through the at least one first valve 404, the amount of processed water entering the mineral infusion section through the at least one second valve 412, and/or the amount of infused water exiting the system 400 through the at least one third valve 416.

Figure 11:
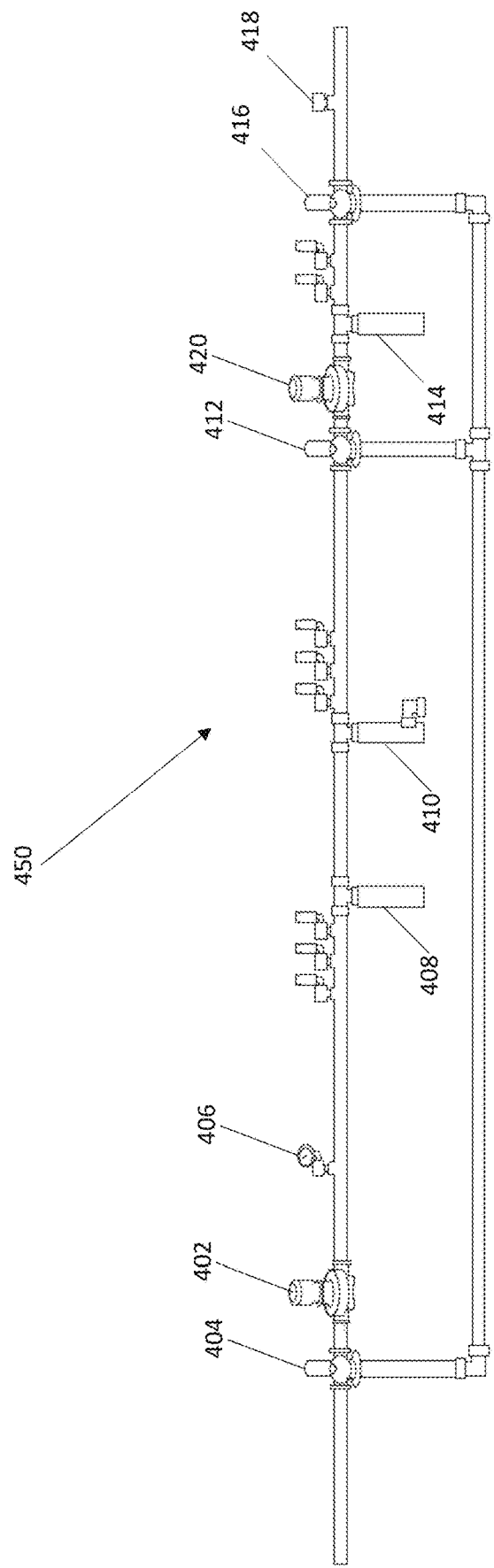
FIG. 11 illustrates a schematic of a water treatment and mineral additive system according to another embodiment of the present invention.

FIG. 11 illustrates a schematic of a water treatment and mineral additive system according to another embodiment of the present invention. FIG. 11 represents a preferred embodiment of the water treatment and mineral additive system 450 relative to the version in FIG. 10. While most components are analogous between the system 450 and the system 400 discussed above with reference to FIG. 10, the system 450 includes a first pump 402 and a second pump 420 and the first pump 402 is located beyond the at least one first valve 404, rather than before the at least one first valve 404. The positioning of the first valve 404 helps to ensure that the system is able to recirculate processed water back into the water treatment section in the event that the water is not sufficiently purified. Similarly, the inclusion of the second pump 420 allows the water to be recirculated in the mineral infusion section to allow for more precise control of TDS or pH in the system 450.

Figure 12:
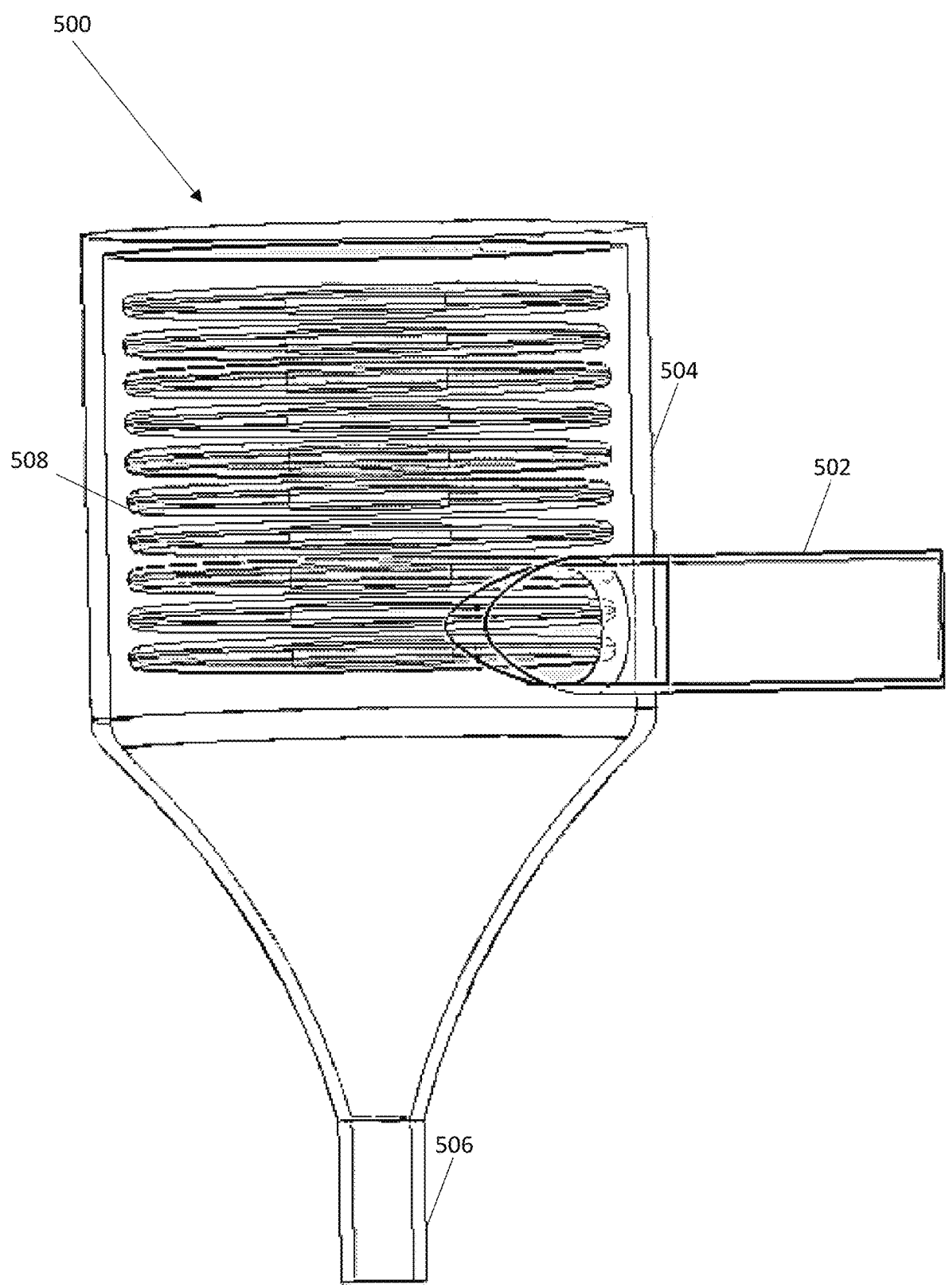
FIG. 12 illustrates a transparent orthogonal side view of a vortex mineral infuser according to one embodiment of the present invention.

FIG. 12 illustrates a transparent orthogonal side view of a vortex mineral infuser according to one embodiment of the present invention. In one embodiment, the at least one mineral infusion system is a vortex infuser 500. In one embodiment, the vortex infuser 500 includes an inlet 502 for accepting incoming water. In one embodiment, the inlet 502 is connected to a cylindrical (or otherwise shaped) infusion chamber 504. The infusion chamber 504 includes a tapered bottom connected to an outflow 506. In one embodiment, the infusion chamber 504 includes bioceramic beads, bioceramic materials, or other mineralization sources for increasing TDS of the incoming water. The infusion chamber 504 is configured to generate a vortex. The vortex allows for longer contact times of the water with the bioceramic beads, bioceramic materials, or other mineralization sources, allowing for increased TDS without needing to run the water through multiple infusers or to run the water through the infuser multiple times to achieve a desired TDS level. In one embodiment, the infusion chamber 504 includes one or more bioceramic discs 508 over which the water flows to allow for mineral infusion.

In one embodiment, any of the above-mentioned systems, including the standing water dispensing system, the mobile water carrying station, the tabletop water dispensing station, and the sit-down water dispensing station are in network communication or wired communication with at least one user device (e.g., at least one smart phone, at least one computer, at least one smart watch, a control panel, etc.). In one embodiment, the network communication includes WI-FI, cellular (e.g., 3G, 4G, 5G, etc.), or BLUETOOTH communication or wired communication, including but not limited to Ethernet connection. The systems are able to receive inputs from the at least one user device to modify a property of the water dispensed by the systems, including but not limited to total dissolved solids (TDS), pH, temperature, volume, and/or other properties. In one embodiment, the systems are operable to automatically modify the properties of the water in order to match the preferences transmitted to the systems by the at least one user device.

In one embodiment, for example, the systems include one or more inline thermoelectric elements (e.g., Peltier chips) at the proximate to the dispenser or within another part of the system configured to heat or chill water before dispensing it in order to match user preferences. In one embodiment, the systems include at least one temperature sensor configured to detect a temperature of the dispensed water. Inclusion of the at least one temperature sensor allows for the one or more inline thermoelectric elements to vary an amount of heating or cooling to match desired preferences or preset controls. In one embodiment, the systems are operable to receive commands from at least one user device including a desired temperature (or temperature range) of the dispensed water. However, one of ordinary skill in the art will understand that the system is also able to include other systems for heating or chilling water, such as those described in U.S. Pat. No. 11,479,455 or U.S. Patent Publication No. 2017/0292782, which are incorporated herein by reference in its entirety.

In one embodiment, the systems are able to vary TDS or pH by recirculating water within the system through a bioceramic-containing mineralization system multiple times depending on the desired TDS or pH or to dilute the water with processed, non-mineralized water, as described in U.S. Provisional Patent Application No. 63/398,389, which is incorporated herein by reference in its entirety.

In one embodiment, the system is operable to receive a request in add one or more mineral salts to the water from one or more user devices. In one embodiment, the request causes a controller in the system to release a valve proximate to the dispenser of the systems, causing a quantity of mineral salts to be added to the outgoing water stream. In one embodiment, the request includes a quantity and/or concentration of mineral salts to add to the water stream to achieve a desired flavor or health benefit.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Figure 13:
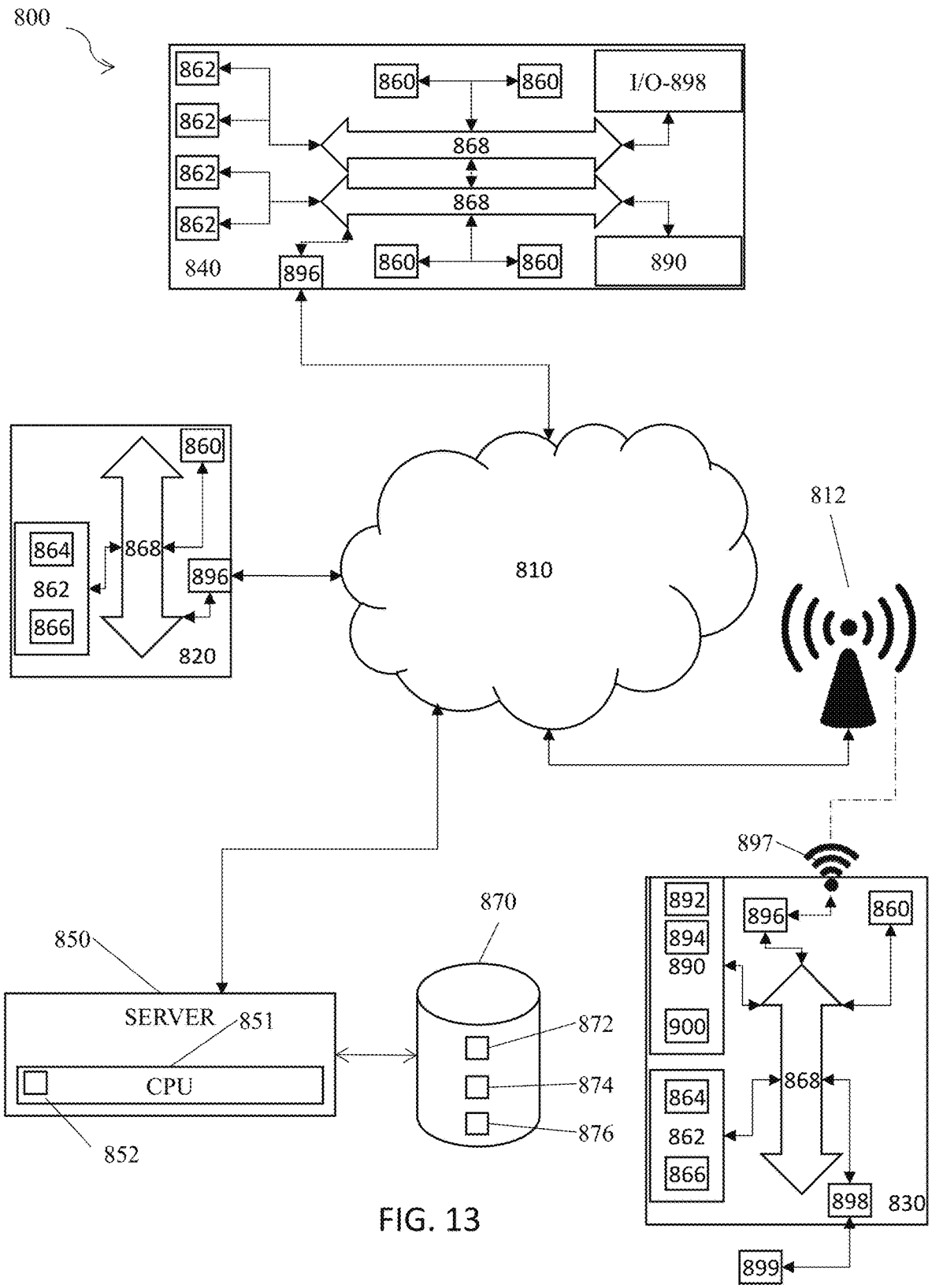
FIG. 13 is a schematic diagram of a system of the present invention.

FIG. 13 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 13, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 13, is operable to include other components that are not explicitly shown in FIG. 13, or is operable to utilize an architecture completely different than that shown in FIG. 13. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An apparatus for dispensing water and tracking water consumption, comprising:
    a water inlet and/or storage tank;
    a mineral infuser system connected to the water inlet and/or storage tank, wherein the mineral infuser system includes at least one bioceramic material;
    at least one total dissolved solids (TDS) sensor and/or at least one pH sensor configured to determine TDS and/or pH of water exiting the mineral infuser system;
    at least one valve configured to recirculate water exiting the mineral infuser system back into the mineral infuser system if the TDS and/or the pH of the water is lower than a preset minimum;
    a processor; and
    a dispenser;
    wherein the apparatus is configured to receive commands from at least one user device, and wherein the commands include a desired minimum TDS or pH of dispensed water and/or a desired maximum TDS or pH of the dispensed water;
    wherein the apparatus is configured to recognize at least one radio-frequency identification (RFID) chip connected to a liquid container in network communication with the at least one user device and determines to which of the at least one user device to receive commands from and/or to transmit data regarding the dispensed water;
    wherein the processor is configured to transmit information about the water dispensed to a server platform to update a user profile associated with the RFID chip, wherein the information includes the pH of the water dispensed, an amount of the water dispensed, and a time the water was dispensed;
    wherein the liquid container includes at least one hydration sensor configured to detect the hydration status of a user and automatically update the user profile with the hydration status of the user, wherein the at least one hydration sensor includes at least one volume sensor configured to determine changes in the total volume of water in the liquid container over time; and
    wherein the apparatus is configured to access the user profile and tracks water consumption over at least one time period for the user profile based on updates to the user profile from the at least one hydration sensor.

2. The apparatus of claim 1, wherein the at least one valve is configured to selectively receive uninfused water to mix with the water exiting the mineral infuser system if the TDS and/or the pH of the water is greater than a preset maximum.

3. The apparatus of claim 1, wherein the at least one user device includes at least one smart phone, at least one user panel, at least one computer, at least one tablet, and/or at least one smart watch.

4. The apparatus of claim 1, wherein the mineral infuser system includes at least one vortex chamber configured to generate a vortex of incoming water over the at least one bioceramic material.

5. The apparatus of claim 1, further comprising one or more mineral salt chambers configured to release one or more mineral salts into the dispensed water based on the commands received from the at least one user device.

6. The apparatus of claim 1, further comprising at least one thermoelectric cooling element attached to a section of a tube between the mineral infuser system and the dispenser, wherein the at least one thermoelectric cooling element is configured to heat or cool the dispensed water.

7. The apparatus of claim 1, further comprising at least one volumetric flow meter configured to detect a volume of water dispensed by the apparatus.

8. The apparatus of claim 7, wherein the apparatus is configured to transmit the volume of water dispensed by the apparatus to the at least one user device associated with the liquid container.

9. The apparatus of claim 1, wherein the at least one volume sensor is configured to produce volume data, wherein the at least one hydration sensor is configured to use the volume data to determine the hydration status of the user.

10. The apparatus of claim 1, wherein the information further includes a geolocation where the water was dispensed.

11. The apparatus of claim 1, wherein a payment method associated with the user profile is charged upon the apparatus dispensing the water.

12. The apparatus of claim 1, further comprising a display configured to display information regarding the water dispensed from the apparatus including the pH of the water and the TDS concentration of the water, wherein the display is further configured to display data associated with the user profile including water consumption over the at least one period of time for the user profile.

* * * * *